Figure 1:
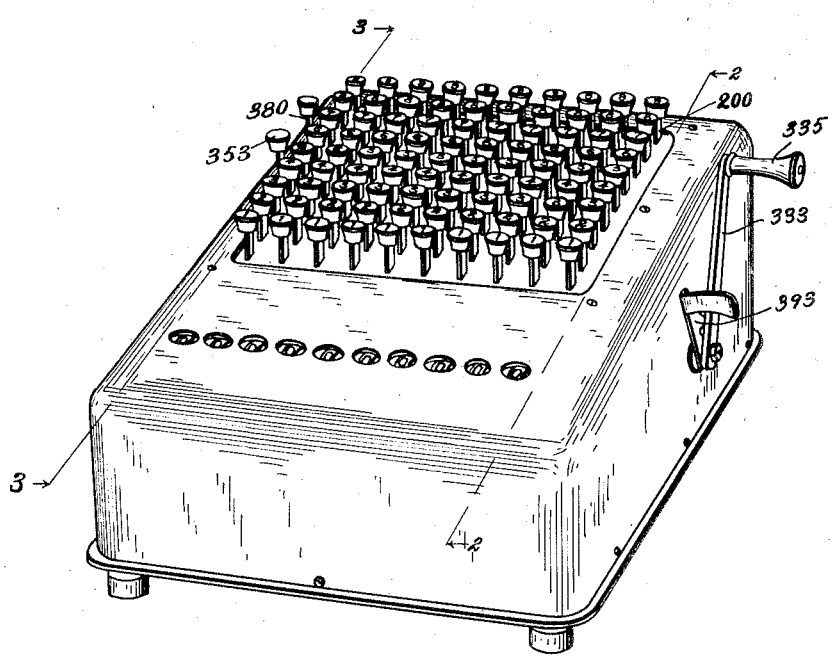

G. J. BARRETT.
CALCULATING MACHINE.
APPLICATION FILED JAN. 3, 1910.

976,336.

Patented Nov. 22, 1910.
13 SHEETS—SHEET 1.

Witnesses
F. G. Tallman
L. G. Greenfield

Inventor
Glenn J. Barrett
By Chappell & Earl
Attorney

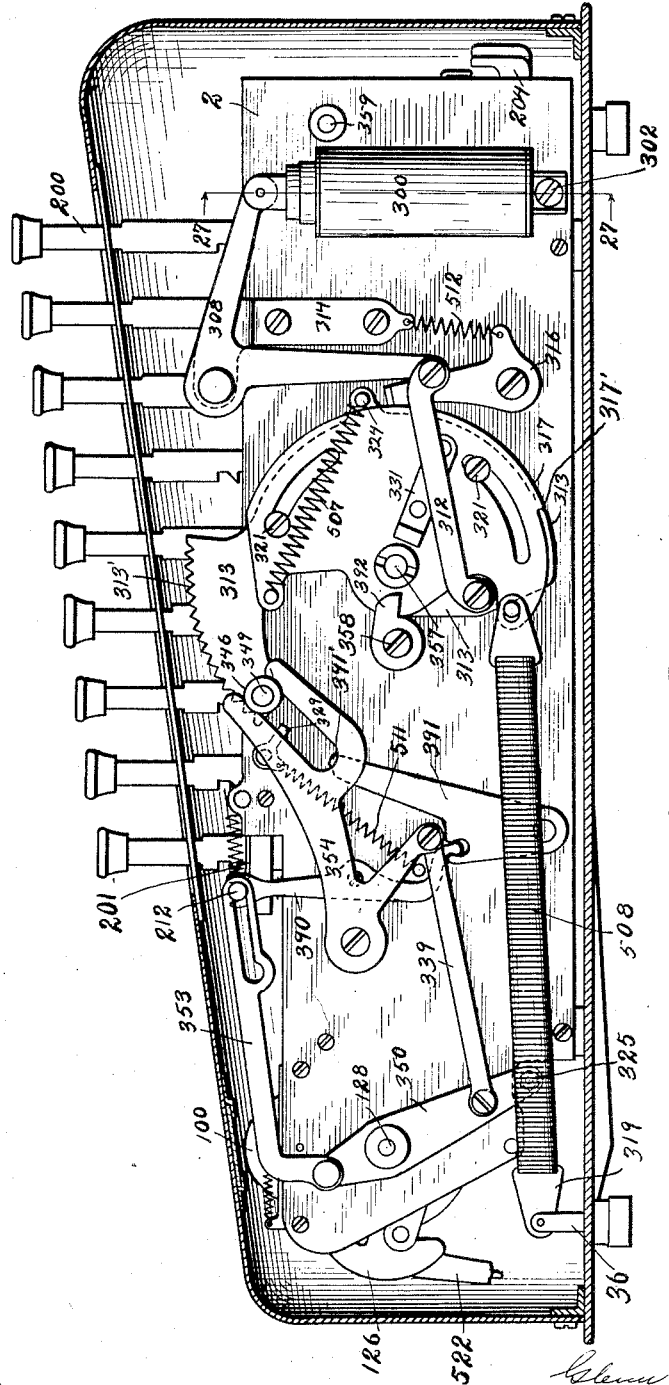

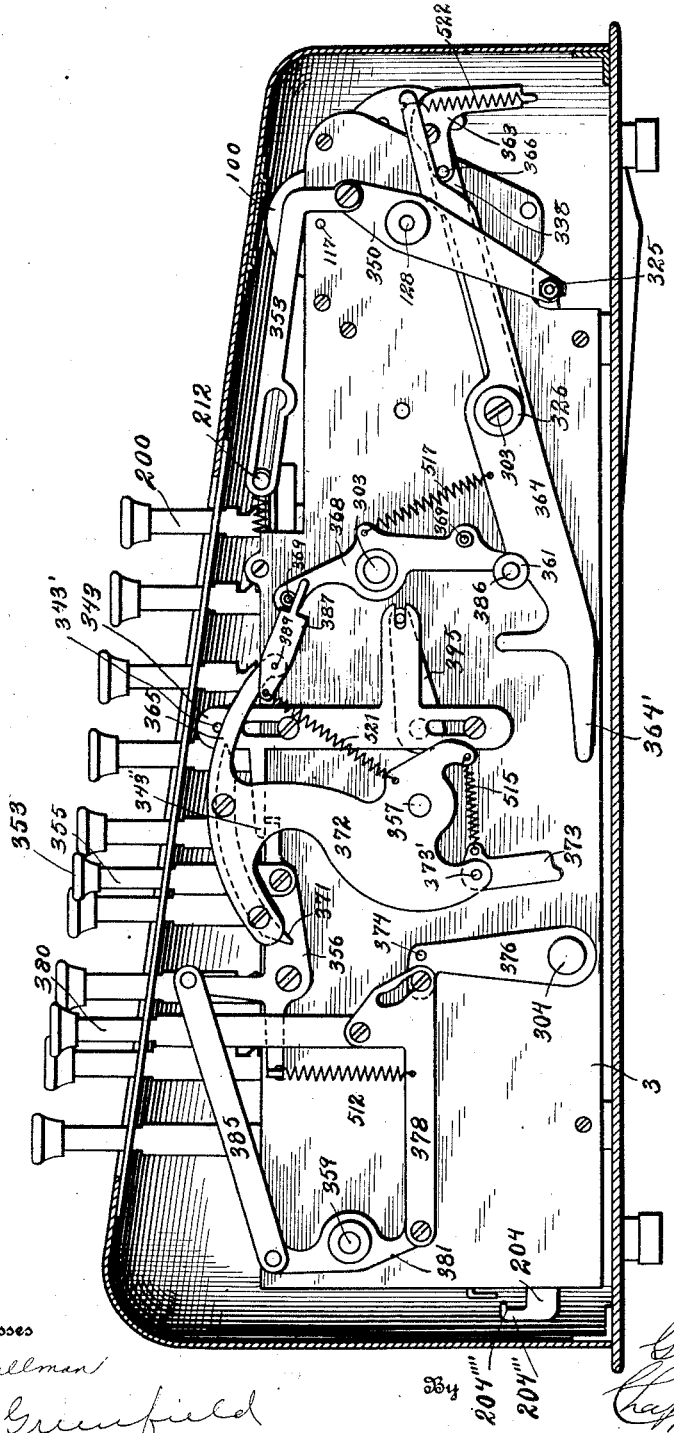

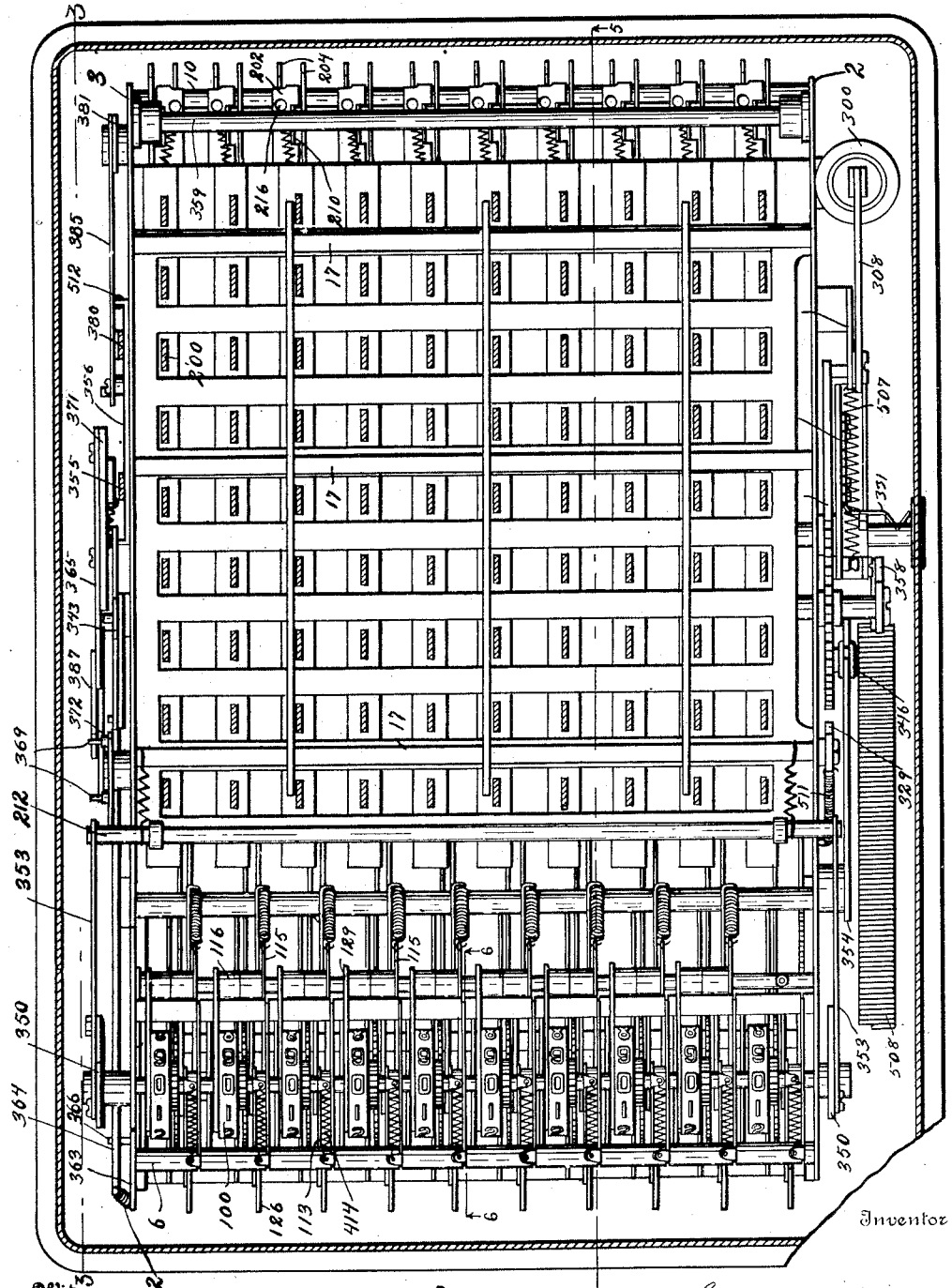

G. J. BARRETT.
CALCULATING MACHINE.
APPLICATION FILED JAN. 3, 1910.
976,336.
Patented Nov. 22, 1910.
13 SHEETS—SHEET 5.
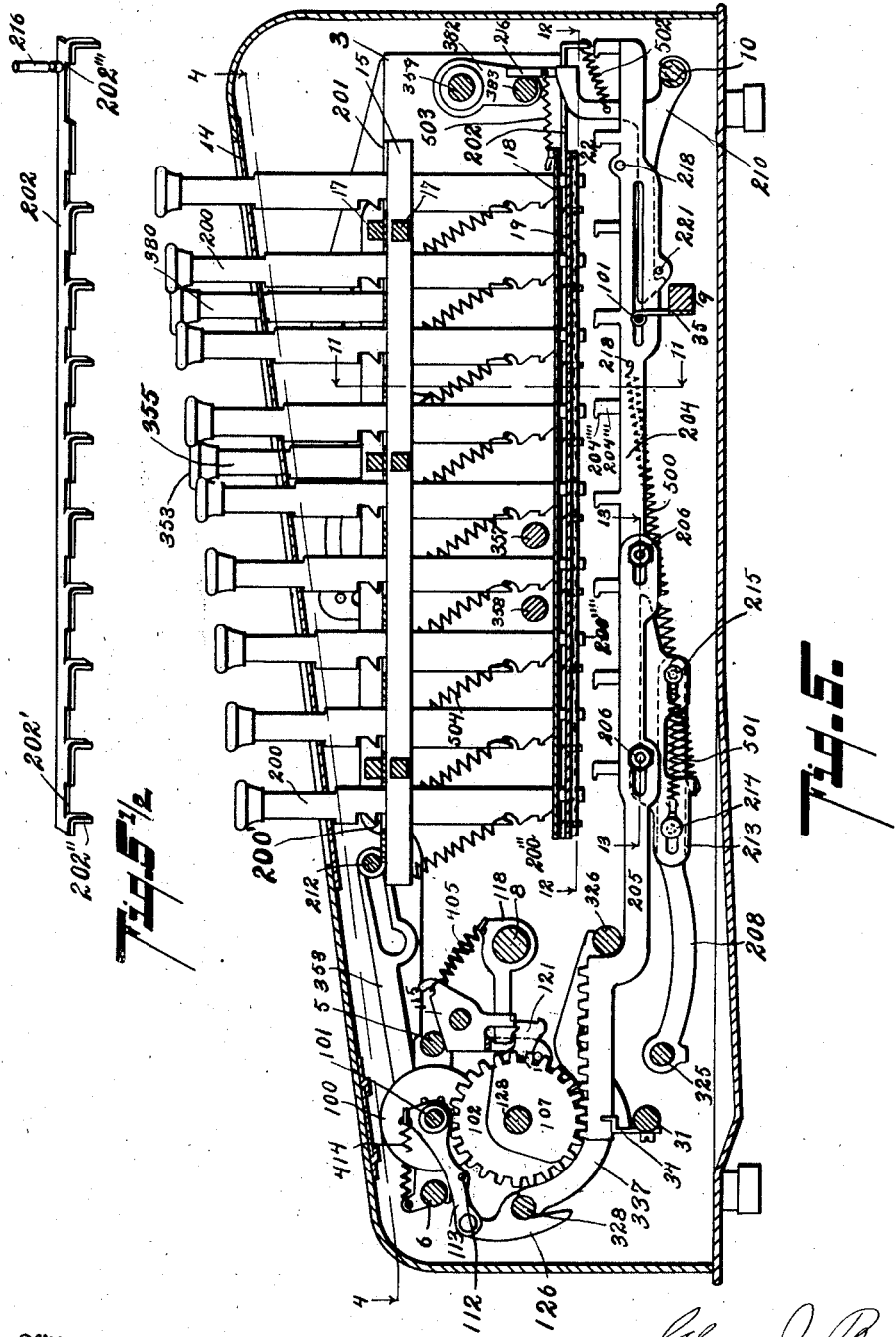
Witnesses
F. G. Tallman
L. G. Greenfield
Inventor
Glenn J. Barrett
By Chappell Earl
Attorney

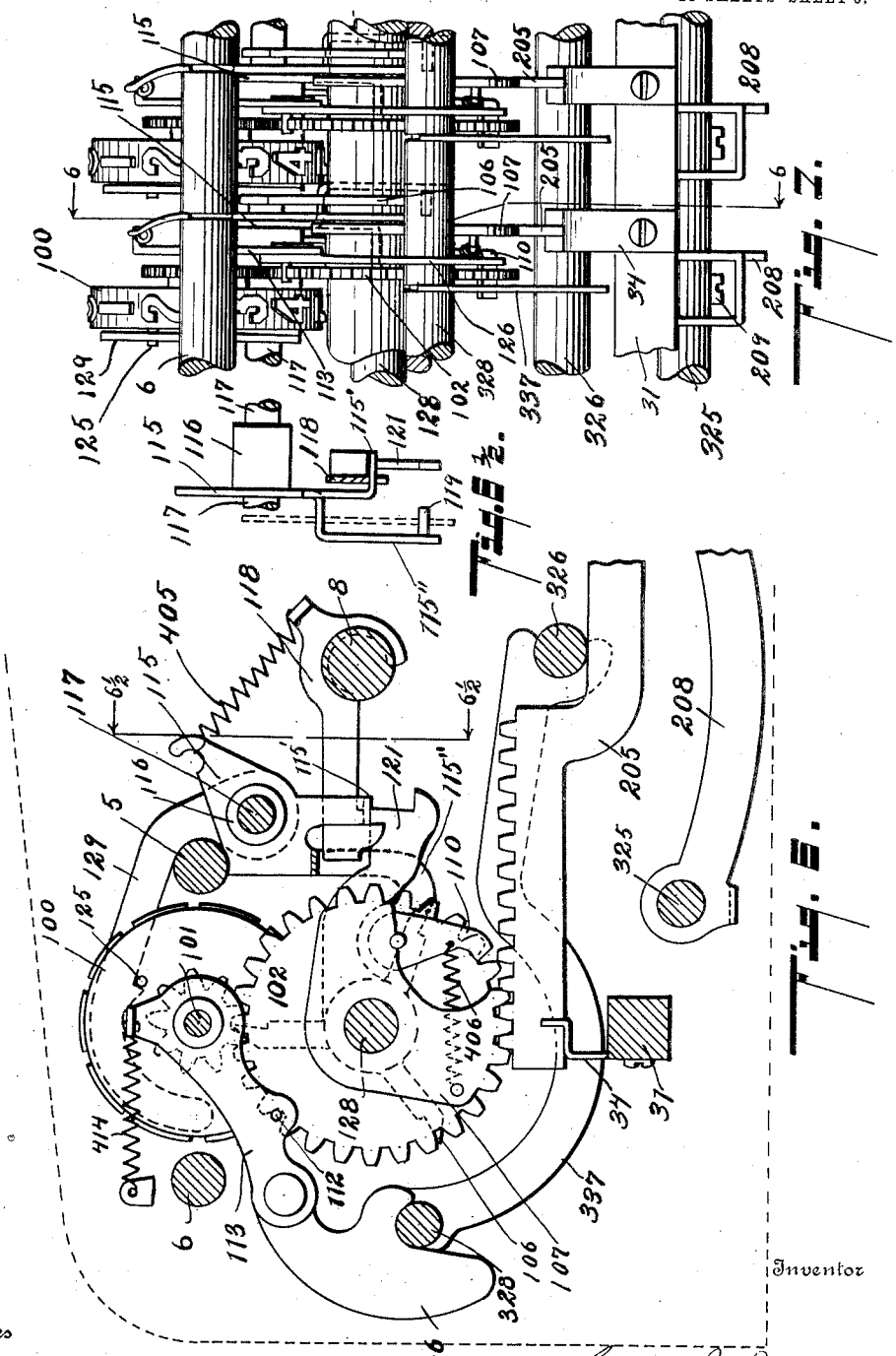

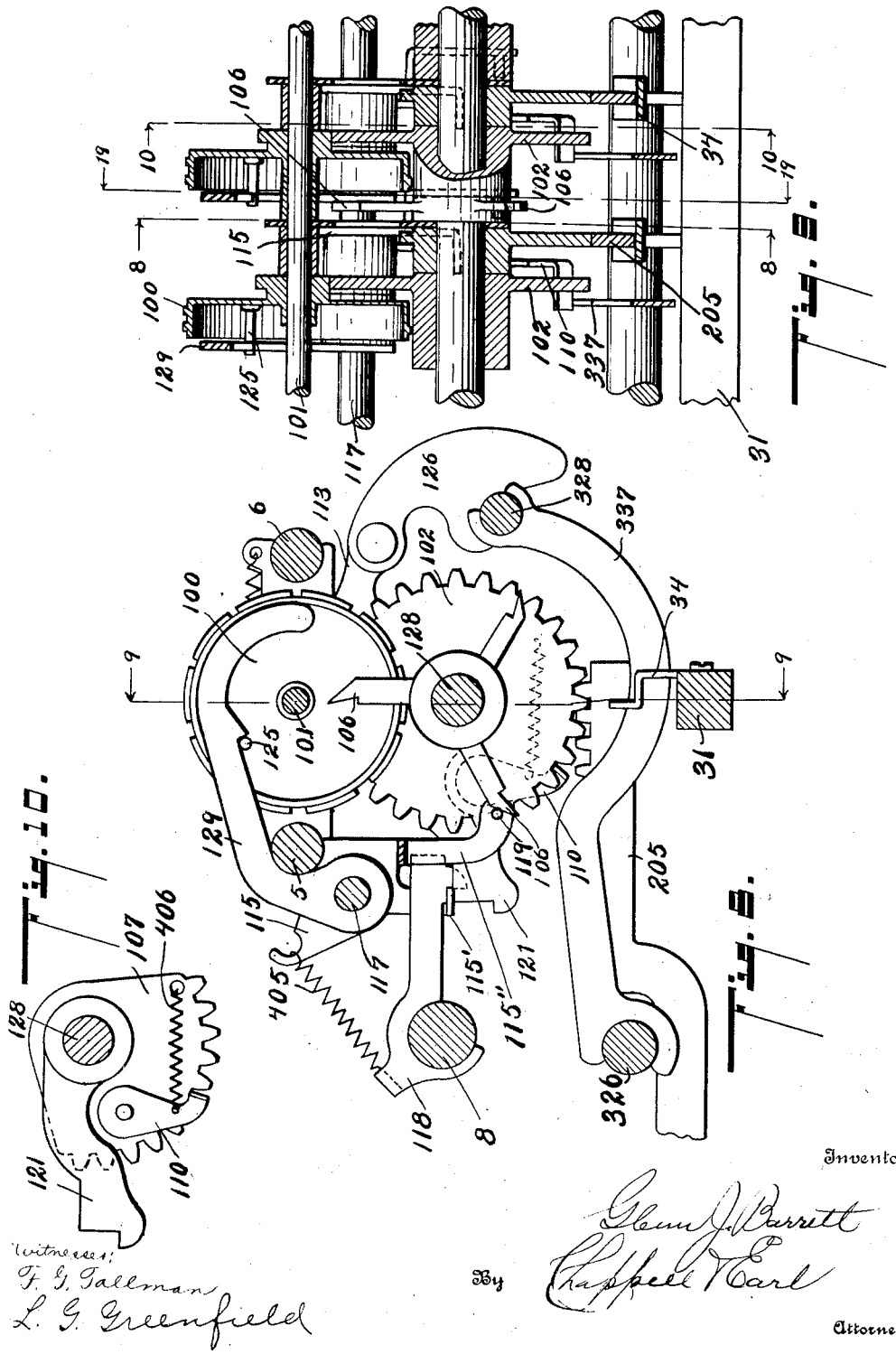

G. J. BARRETT.
CALCULATING MACHINE.
APPLICATION FILED JAN. 3, 1910.
976,336.
Patented Nov. 22, 1910.
13 SHEETS—SHEET 8.
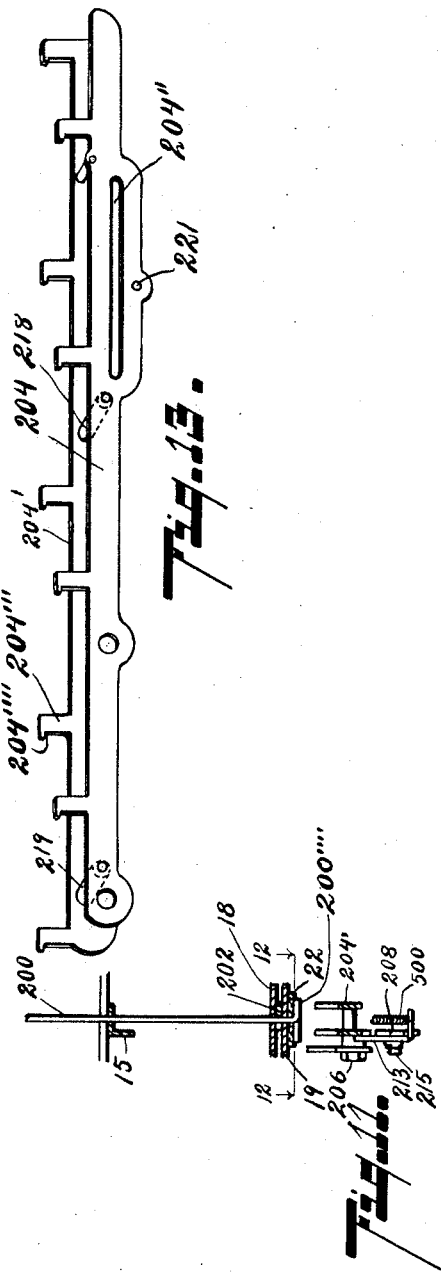
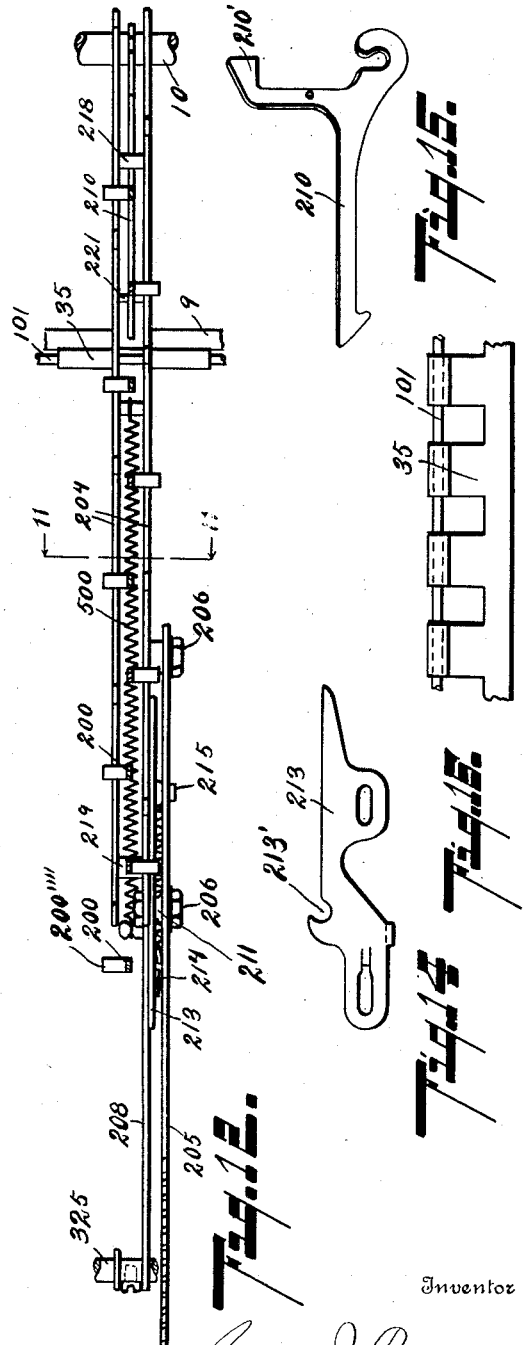
Witnesses
F. G. Tallman
L. G. Greenfield
Inventor
Glenn J. Barrett
By Chappell Earl
Attorney

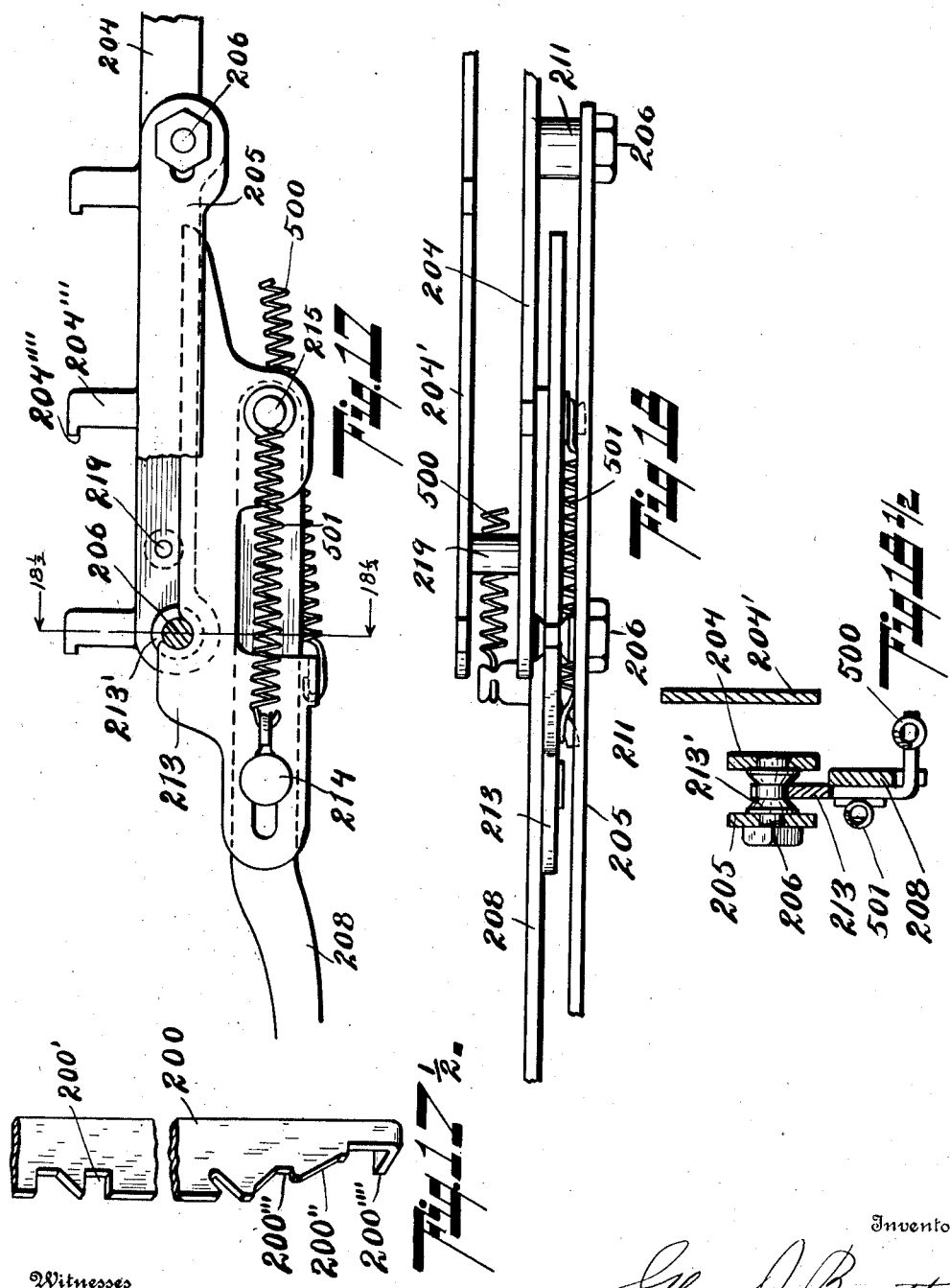

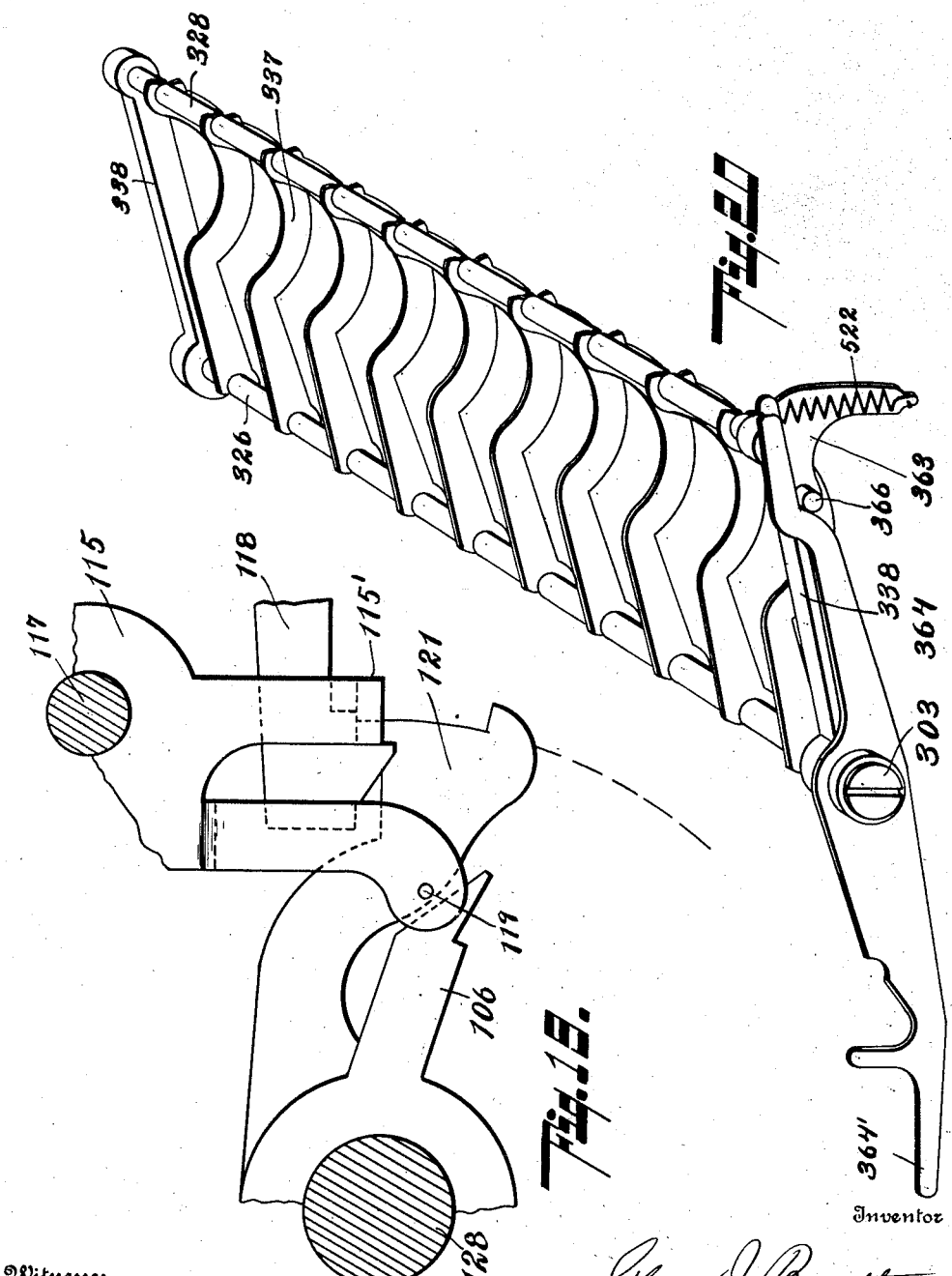

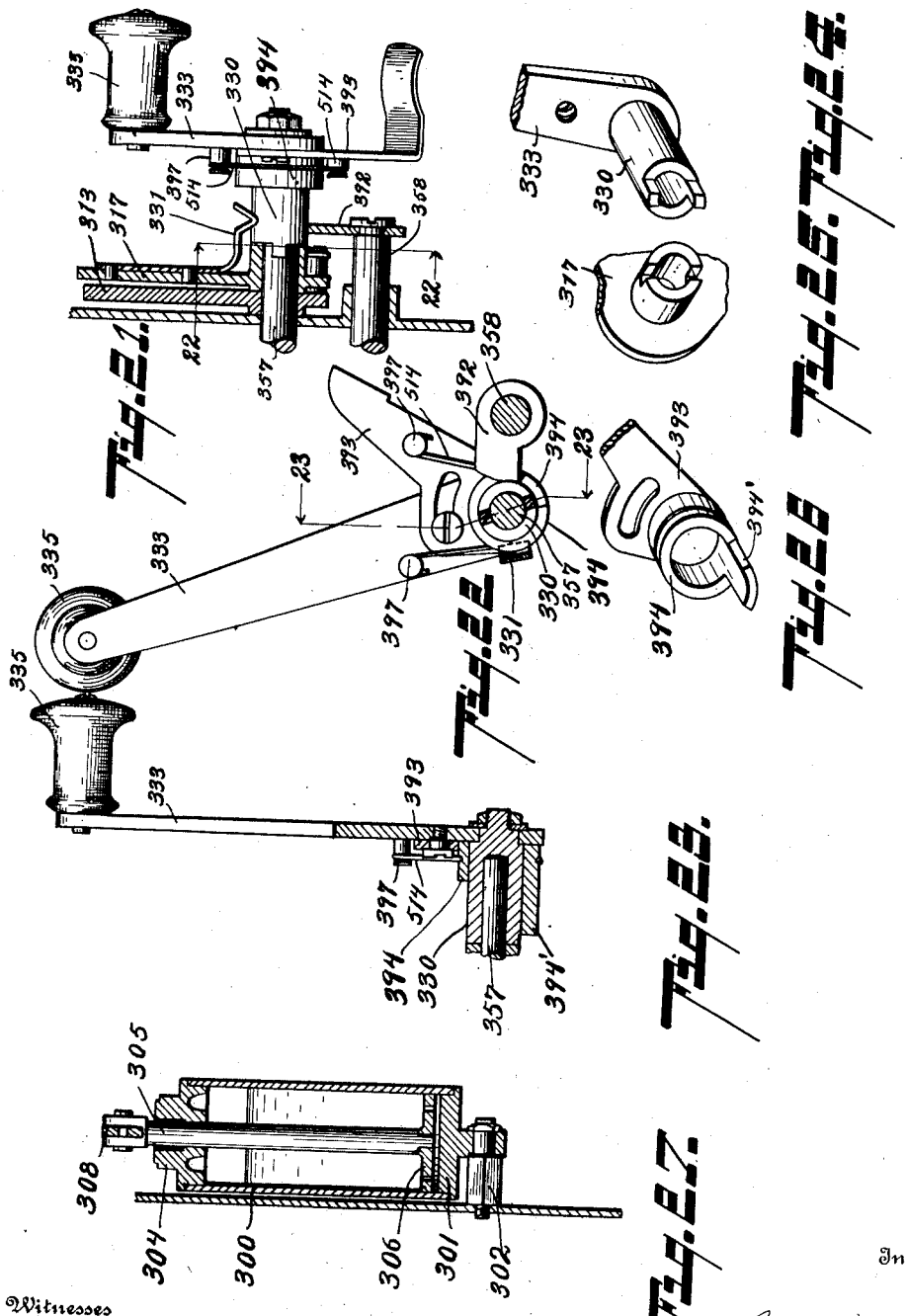

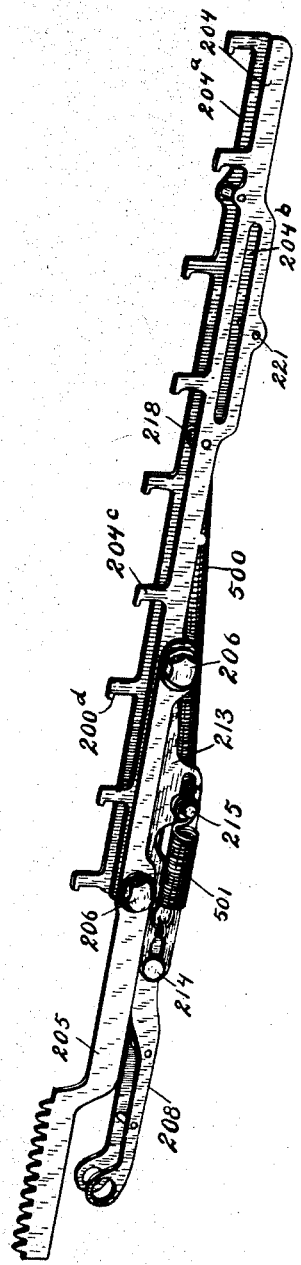
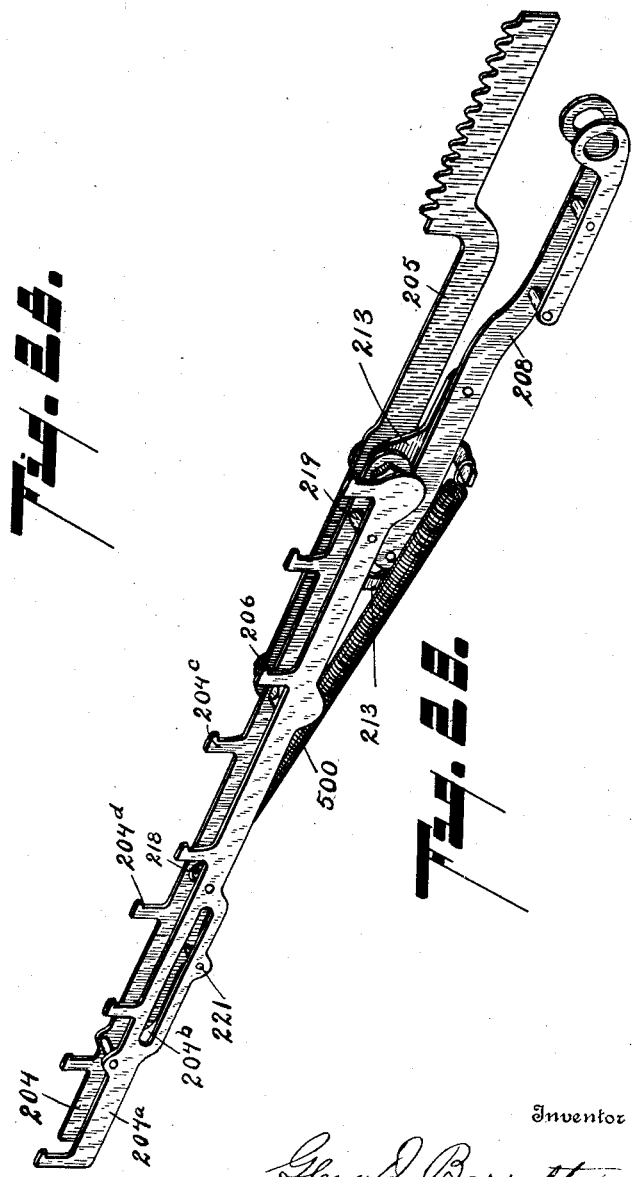

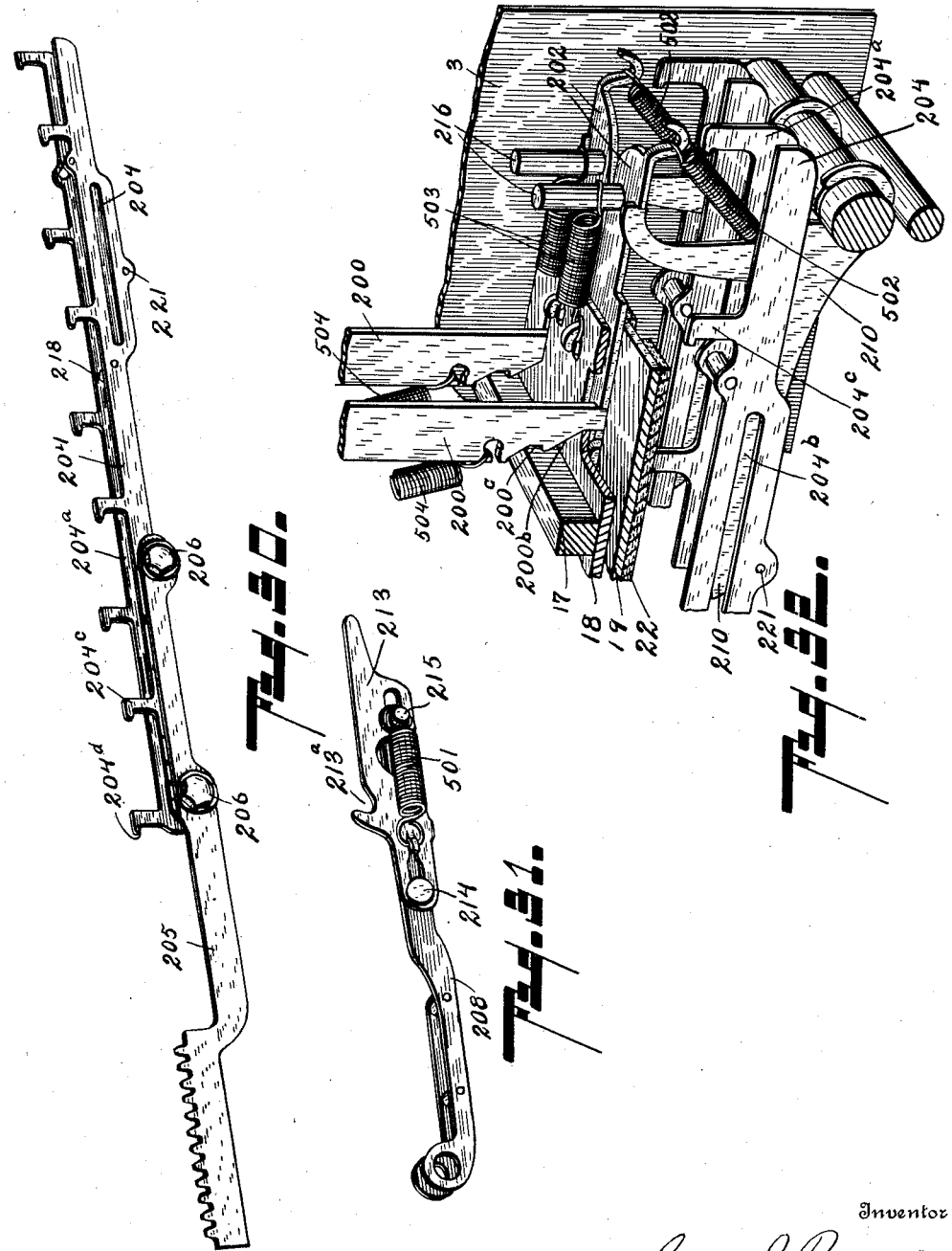

UNITED STATES PATENT OFFICE.

GLENN J. BARRETT, OF GRAND RAPIDS, MICHIGAN, ASSIGNOR OF TWO-THIRDS TO GRAND RAPIDS BRASS COMPANY, OF GRAND RAPIDS, MICHIGAN.

CALCULATING-MACHINE.

976,336.   Specification of Letters Patent.   Patented Nov. 22, 1910.

Application filed January 3, 1910. Serial No. 586,185.

*To all whom it may concern:*

Be it known that I, GLENN J. BARRETT, a citizen of the United States, residing at Grand Rapids, Michigan, have invented certain new and useful Improvements in Calculating-Machines, of which the following is a specification.

This invention relates to improvements in calculating machines.

The invention relates particularly to improvements in key setting adding machines of a simple type in which the printing feature is omitted.

The objects of the invention are to provide a machine of the class described, which is portable, compact, light, simple to operate, easy of action, requiring little power, accurate, speedy and convenient, and also practical to manufacture.

Objects in detail are to improve the key-stem; to improve the flexible key-board; to improve the structure generally in its relation to the slide and rack details which will render a forward governor unnecessary; to provide improved means for storing power for the carrying operation, which shall be independent of the rack and slide; to provide means for forcing the digit slides forward, which will avoid the necessity of a powerful main-spring to overcome the combined tensions of the individual digit actuator springs; to provide an improved structure and arrangement of the parts for transmitting power from the digit actuating members to the dials; to provide an improved means for positively locking the digit actuating members to the rotatable members and dials to prevent any relative movement during the actuation of such dials; to provide a lock of the kind indicated; to provide improved means for carrying from the lower to the higher denominations of dials; to provide an improved detachable operating handle mechanism; to provide improved means of resetting the dials to the zero point; to provide improved means for automatically releasing the key-stems; to provide improved means of releasing the key-stems gradually to permit their upward movement by a step-by-step movement to avoid unnecessary noise; to provide improved means for repeating any numerals set in the key-board; to improve the details of such structures generally, and to generally improve the mechanism and the details of mechanism of calculating machines of this class.

Further objects, and objects pertaining to other and different details of construction, will definitely appear from the detailed description to follow.

I accomplish the objects of my invention by the mechanism and means described in the following specification, which describes fully and completely a preferred embodiment of my invention.

The invention is clearly defined and pointed out in the claims.

A structure illustrating a preferred embodiment of my invention is clearly illustrated in the accompanying drawing, forming a part of this specification, in which, Figure 1 is a perspective view of my improved calculating machine. Fig. 2 is a longitudinal enlarged detail sectional view taken on a line corresponding to line 2—2 of Fig. 1. Fig. 3 is an enlarged detail sectional view taken on a line corresponding to line 3—3 of Figs. 1 and 4. Fig. 4 is an enlarged detail plan view taken in section on a line corresponding to line 4—4 of Fig. 5. Fig. 5 is an enlarged detail vertical sectional view taken on a line corresponding to line 5—5 of Fig. 4. Fig. 5ᴬ is an enlarged detail perspective view of a key-stem release slide. Fig. 6 is an enlarged detail sectional elevation of the number wheels and connections for the transfer mechanism, or accumulating mechanism, taken on a line corresponding to line 6—6 of Figs. 4 and 7. Fig. 6ᴬ is a detail sectional view taken on a line 6ᴬ—6ᴬ of Fig. 6, showing details of the transfer mechanism. Fig. 7 is an enlarged detail fragmentary view of the register or accumulating mechanism, showing the transfer mechanism and its relation to the dials and other parts. Fig. 8 is an enlarged detail elevation view taken on a line corresponding to line 8—8 of Figs. 4 and 9, showing other parts of the transfer mechanism and the relation thereof to the dials and other parts. Fig. 9 is an enlarged detail sectional view partially in full line, taken on a line corresponding to line 9—9 of Fig. 8. Fig. 10 is an enlarged detail view taken on line 10—10 of Fig. 9, showing the actuating sector and spring pawl thereon. Fig. 11 is an enlarged detail sectional view taken on line 11—11 of Fig. 12, showing details of the key-stem and related parts. Fig. 12 is an enlarged detail sectional plan view taken on line 12—12 of Fig. 11, showing the digit sliding mechanism. Fig. 13 is an enlarged detail perspective view of one of the digit slides 204. Fig. 14 is an enlarged detail side elevation of the carrying actuator slide. Fig. 15 is an enlarged detail perspective view of the digit slide catch 210. Fig. 16 is a detail elevation view of the guiding supporting frame for the digit slides. Fig. 17 is an enlarged detail elevation view taken partially in section on line 17—17 of Fig. 18, parts being broken away, showing details of arrangement and connection of the carrier mechanism actuating slide. Fig. 17$^A$ is an enlarged detail perspective view of the lower end of one of the key-stems 200. Fig. 18 is an enlarged detail fragmentary plan view of the actuator slide of the carrier mechanism and its connected parts, the same being a plan view of the structure appearing in Fig. 17. Fig. 18$^A$ is an enlarged transverse detail sectional elevation taken on line 18$^A$—18$^A$ of Fig. 17, showing the arrangement of said actuator slide and adjacent parts. Fig. 19 is an enlarged detail elevation view taken on line 19—19 of Fig. 9, showing details of the carrying cam means and actuating connections therefor. Fig. 20 is an enlarged detail perspective view of the locking frame for the dial actuating pawls, showing details of the sector and the actuating mechanism and connecting spring. Fig. 21 is an enlarged detail sectional elevation of the operating lever and its connections and parts, taken on a line corresponding to the irregular line 21—21 of Fig. 22. Fig. 22 is an enlarged detail sectional view of the lever actuating means, taken on line corresponding to line 22—22 of Fig. 21. Fig. 23 is a detail sectional elevation taken on line 23—23 of Fig. 22. Fig. 24 is an enlarged detail perspective view of the crank and crank shank. Fig. 25 is an enlarged detail fragmentary perspective view of the crank connecting hub. Fig. 26 is an enlarged detail perspective view of the inner end of the key-stem releasing lever mounted upon the shank of the actuating lever. Fig. 27 is an enlarged detail vertical sectional view through the governor or dash pot mechanism taken on line 27—27 of Fig. 2. Fig. 28 is a detail perspective of the digit slide 204 and push bar 208 and connecting parts, taken from the upper side of Fig. 12. Fig. 29 is a similar perspective view, of the parts appearing in Fig. 28, taken from the lower side of Fig. 12. Fig. 30 is a detail perspective view of the digit slide and rack with the push bar disconnected. Fig. 31 is a detail perspective view of the push bar and its spring. Fig. 32 is a detail perspective view of the various parts of the interior of my machine, toward the back thereof, indicating the general relation of the various slides, locks and key stems.

In the drawing, similar numerals of reference refer to similar parts throughout the several views, and the various sectional views are taken looking in the direction of the little arrows at the ends of the section lines.

In referring to the numerals of reference, I desire to remark that I have applied to the different parts here the same numerals which were made use of in identifying the parts on my working drawings, and for that reason the consecutive order of the numbers is not preserved. With this explanation, the description which follows will not be confused.

The machine is made up of the usual outer casing, and the parts are supported on an internal frame work supported on the bottom of said casing, consisting in the main of a right-hand side 2 and a left-hand side 3, the parts being connected by the cross bars and bars of the machine which carry the keys, dial mechanism, and their various connections, hereafter to be described.

Fig. 1 shows a general perspective view of my adding machine. It has a key for each digit from "1" to "9" inclusive in each denominate column. The number of which columns is immaterial to my invention, but in the illustration referred to, I have shown ten such columns which would give a capacity of 99,999,999.99. The accumulated sum may be readily seen upon dials arranged at the forward portion of the machine, each dial being directly opposite its corresponding column of finger keys.

This machine is known as a "key-set" adding machine. That is, in its operation any digit in the desired denomination is depressed in the keyboard and locked down in such depressed position, which will indicate to the operator the exact numeral which will be accumulated into the adding mechanism when the operating handle 335, Fig. 1, shall have been drawn forward. Until such operation of the handle, however, it is possible to change the "set" at the will of the operator.

A release button 353 is provided for the purpose of releasing all of the depressed buttons. Near this, on the same side of the machine, is located repeat button 380, the function of which is to prevent the key-stems from being automatically released during the regular operation of the machine. The result of this is that the same number remains "set" in the keyboard and hence the same amount is accumulated into the dials every time the operating handle is drawn forward. The operating handle 335 is located at the right of the machine where it may be conveniently operated by the right hand, the object of which is to operate the mechanism for accumulating the various digits previously set up, into the dials.

Concentric with this main operating handle is the resetting lever 393. When it is desired to reset the dials to the "0" point, this resetting handle 393 is first forced toward the main operating handle 335 and then by drawing the operating handle 335 forward with the resetting lever 393 in this position, the dials will be reset at the "0" point, and the machine will be "cleared." Thus it will be seen that the important result is attained of operating the machine entirely with the right hand, leaving the left hand free for indexing, etc.

A complete description of the details of the mechanism of my invention will now be given.

*Key setting mechanism.*—By reference to Fig. 5, 14 is a plate through which the key-stems 200 extend. A series of guides 15,—one for each denomination or row of keys,—have openings through which these key-stems 200 pass. A plate 201 forming a sliding grate between the retaining bars 17 and guides 15, is adapted to rest upon these guides 15. The edge of the said plate 201 is so arranged as to enter notches 200$^a$ in the sides of all the key-stems 200, when moved to engage the same. Normally the plate 201 is out of engagement with said key-stems and the latter may be depressed. This sliding locking grate fits snugly between the side plates 2 and 3 of the frame, and by reason of such fit, has a guided reciprocating movement. It is actuated by the controlling mechanism which will be hereinafter described. As soon as the operating handle 335 advances far enough to cause any of the operating parts to begin their respective movements, this locking plate or grate 201 slides toward the rear of the machine, by which action all of the key-stems are securely locked against depression by engagement of the notches 200$^a$ by said plate.

Toward the bottom end of the key-stems is a beveled portion 200$^b$. A guide plate 18, having openings for the key-stems, is arranged to guide the lower ends of the said key-stems.

Obliquely arranged springs 504 connect each key to the frame, having a tendency to hold the stems up in normal positions, and also to hold the beveled portion snugly against the forward edge of the openings in the guide plate 18. A supporting plate 19, having openings similar to those in the guide plate 18, with the exception that they are a little longer to accommodate lugs 202$^a$ on key-stem trip plate 202, is arranged thereon. Key-stem trip plate or bar 202, with downwardly-turned lugs 202$^b$ is carried upon this supporting bar 19, and is guided thereon, the said lugs 202$^b$ extending down into the guide slots in the said supporting bar 19, (see Fig. 5) as already indicated. This plate or bar 202 is a common bar, which is actuated by any one of the key-stems, and its purpose will appear from the description that follows. The lower end of the key-stem is provided with a bevel 202$^b$, (see Fig. 17$^A$) which is beneath the notch 200$^c$, which notch is beveled on its upper side.

When any key-stem is depressed, by reason of the bevel 200$^b$ the lower portion of the stem is forced toward the rear of the machine until the notch 200$^c$ catches under the forward edge of the opening in plate 18, and by reason of the forward tension of the spring 504 and the tension of the abutting key trip slide 202, which will be explained, the key-stem is firmly held in such depressed position until some mechanism forces it back toward the rear of the machine and thereby unlatches or disengages the stem from the plate 18 (see Figs. 5, 17$^A$ and 32). Openings 202$^a$ will be noted in bar 202, which are just equal to the width of the key-stem at the point where the said stem latches under the plate 18. An ear 202$^b$ for each key-stem projects downwardly from bar 202, as shown, which ear travels in the forward portion of the opening in the plate 19. The rear portion of each opening 202$^a$ is adapted to abut the rear edge of the corresponding key-stem. Thus it will be readily seen that when any key-stem is forced rearwardly by reason of the contact between the bevel 200$^b$ and the plate 18, it forces also with it the key trip slide 202. A spring 503 extending from the plate 18 to a pin 216 on key trip slide 202 causes the said key-stem trip 202 to be under a slight tension forward, which tension also assists spring 504 in holding the key-stem forward. The lower extremities of these key-stems have stop ears 200$^d$ (see Fig. 17$^A$) extending at right angles to the body, which engage plate 19 and limit their upward movement. Fig. 12 shows a section of these key-stems cut off at their lower extremities, with the ears 200$^d$ extending alternately to the left and to the right, a further object of which will hereinafter appear relating particularly to this alternate arrangement.

The stop ears are to limit the upward movement of the stems under the tension of the springs 504, and strike suitable cushions 22 attached to the under side of the plate 19. A more particular function is to arrest the movement of digit slides at the proper points when they are actuated. In other words, when the key-stem bearing character "1" is depressed and its ear 200$^d$ is thrown down into the path of travel of a digit slide, it will arrest the digit slide when same has traveled forwardly a distance sufficient to cause a movement of one unit on the dial, when the slide shall be restored again to normal position. This movement will be more particularly explained in connection with said digit slides.

Up above the latching portion 200$^c$ of the key-stems will be noted another bevel, the function of which is to furnish a surplus of rearward movement to the stems when it is desired to impart to the releasing slide 202 movement sufficient to relieve any other key-stem which may have been previously latched down in the same row. Thus, if an error be made in the depressing of any given key in a row, when the correct key is depressed to its limit, it furnishes sufficient movement to the trip slide 202 to unlatch the erroneously depressed key-stem, which immediately returns to normal position, and the correct key remains latched down. The ears 202$^b$ hold the slides 202 in position and also abut the beveled portion 200$^b$ of the stem, when forcing the stem rearwardly for the purpose of unlatching them from the plate 18.

In Figs. 5 and 13 appear the digit slide and upon the ears extending upwardly from the side bars 204 and 204$^a$ respectively will be noticed engaging notches 204$^d$. When the ears 200$^d$ on the key-stems are down in operative position in the path of travel of these upwardly projecting ears 204$^c$ from side bars 204 and 204$^a$, this notch engages the key-stem ears 200$^d$, and by reason of the tension of the spring 500 during the operation of the machine, these notches referred to retain the key-stems in operative depressed positions, after the same have been released by key-stem trip of the slides 202. For instance, if key-stems bearing the number "2" be depressed, the slides move forwardly until the ears and notches coöperating with the numeral "2" key-stems engage such key-stems. On the return movement of the operating mechanism, the key-stems are released from the guide plate 18 before the slides are picked up and restored to their normal positions, in which case the notches on the ears of said slides will retain the key-stems, allowing the latter to rise part way in their movement toward normal position, then when said slides are picked up and the tension of the spring 500 removed, the key-stems are free to move toward normal position the remainder of the distance, thus preventing the jar which would be felt during the release of several key-stems at the same instant, particularly if allowed to travel the entire distance to normal position at a single impulse.

383 is a bail rod for the purpose of forcing all of the slides 202 rearwardly when releasing all of the key-stems, and this is accomplished by reason of a contact of said bail rod and pins 216 on each of the various slides 202. The action of this bail rod will be more particularly explained in connection with the control mechanism.

Fig. 11 shows a front sectional view of the key-stem arrangement with reference to the stopping ears of 204 and 204$^a$ viewed, however, from the rear. As the movement of the slides in setting up a number "9" is greater than the distance between the two consecutive teeth or ears of the frame shown in Fig. 13, by staggering the ears as shown this difficulty is overcome. This frame thus formed is a rigid one and one which may be firmly seated in its bearings without tendency to turn sidewise, by the slot 204$^a$ engaging bar or rod 101.

*Digit setting mechanism.*—Under the guide plates for the key-stems are the digit slides, one for each row of key-stems, and adapted to coöperate with said key-stems. The stopping portion of these slides is made of two side portions 204 and 204$^a$, (Figs. 11, 12 and 13) with the rivets 218 and 219 between them. A slot 204$^b$ will be seen in the rear portion of these stop pieces, through which passes the supporting and guiding rod 101. A guiding frame 35 supports said slides at the rear, and rod 101, as shown. Upon the right side of this frame is rigidly attached the toothed rack bar 205, by means of the bolts 206, in such a manner as to leave a narrow guiding space between said bars 205 and 204. Spool-shaped bushings 211 are interposed between the bars, the function of which will be hereinafter explained.

The forward portion of the rack bar 205 is supported and guided by the guides 34, (see Fig. 5), at the front of the machine. Thus it will be readily seen that the slide comprising the parts 204, 204$^a$ and 205 with the connecting pieces, is adapted to slide from the rear of the machine toward the front and vice versa.

A bail rod 325 extending between the arms 350 on each side of the machine has imparted to it a swinging motion from the rear toward the front and return, as the operating handle is operated. Freely mounted upon this bail rod are the push bars 208. Slidably mounted upon each of said push bars 208 are the pieces 213, which are supported on the studs 214 and 215 upon said bar 208 arranged in slotted holes in said piece 213.

A carrying spring 501 extends between stud 215 on bar 208 and said slide 213, exerting a tension upon slide 213 toward the rear of the machine. A notch 213$^a$ on said slide 213 is adapted to receive the forward spool bushing 211, above referred to. Normally, when no key-stem is depressed, the slides cannot go forward, being held by the retaining catches 210, which are pivotally mounted on the stay rod 10. An abutting portion of these catches 210$^a$ is adapted to rest against a notch 202$^c$ in key trip slide 202, in which position it is normally held by the spring 502, which connects said latch to the rear end of bar 19, (see Fig. 5). Whenever one of the slides 202 is forced rearwardly by the depression of a key-stem, the forward engaging portion of the latch 210 is lifted out of the path of travel of the stopping pin 221 provided on the side 204 of the digit slide. As the trip 202 is held in this position as long as a key-stem is depressed, the particular slide 204 and parts coöperating with this catch 210 are free to advance forward when the operating handle is actuated. However, if there be no key-stem depressed, these catches retain all of the slides.

A compensating spring 500 extends between the digit slide frame side 204, being connected at 218, and slide 213, as will be seen, which holds notch 213$^a$ snugly upon the spool bushings 211 when the parts are in normal positions. As push bar 208 advances by reason of the swinging bail 325 which is actuated by the operating handle, as will be later shown, if engaging catches have not been raised, the notch 213$^a$ is forced away from the bushing 211 and the plain edge of slide 213 rides along on the under side of said bushing. The bail 325 always has the same movement every time the operating handle is drawn forward. If a number "1" key-stem has been depressed, the digit slide moves forward a distance sufficient to rotate the dials one space. When the bail 325 engages said push bar on its return, it forces said slide back to normal position. The number "1" key-stem coöperating with the forward ear on the digit slide prevents any further forward movement of said slide, and thus the correct amount is registered. Further movement of the bail 325 after contact of the number "1" stopping ear on 204' and the number "1" key-stem, causes the notch 213' to leave the bushing 211. It will be readily seen that the function of this notch 213 is to exert more than the ordinary tension of the spring 500 in forcing the slide 204 forward. It will be noted that the springs 500 are only extended after the slides reach their respective limits. If a number "9" key-stem be depressed, then the slide advances forward a distance equal to nine dial spaces, or until the last ear on 204' is arrested against the lower extremity of the number "9" key-stem. In this case the spring 500 is very little extended. If these springs for actuating the digit slides were attached to the base of the machine instead of to the moving push bar 208, the main handle spring would have to be of sufficient strength to overcome all of these individual slide springs. By reason of the structures above described, only a very light spring tension is required on the operating handle, which means that very little force is required to operate the handle.

The purpose of the slotted connection between 213 and 208 is for the purpose of storing power for the carrying operation, which will be described in connection with the carrying mechanism.

A rock shaft 128 extends through the machine, to which the rock shaft arms 350 are rigidly attached. Upon this shaft at each dial section is freely mounted the gear 102 upon a suitable hub, the other end of which carries the carrying cams 106. On this same dial section is also freely mounted the gear sector 107 (see Figs. 6, 7 and 10), which is always in mesh with the rack bar 205. As the rack bar 205 moves forward and back, this sector rocks on the shaft 128, being movable thereon. The sector has a suitable hub upon the other end of which is carried the stopping arm 121, detailed in Fig. 10, which of course moves in synchrony with the sector and rack 205. On the sector, in the space between the said sector and the gear 102 which in this case is about one-eighth of an inch, is freely mounted the digit pawl 110 upon a stud rigidly secured to the sector 107. This digit pawl has an offset tooth at its extremity which is adapted to engage the teeth of the gear 102, and is so positioned and inclined that, as said sector and pawl swing toward the front of the machine, the tooth slips freely over the teeth of said gear, but when the sector returns toward normal position, the pawl firmly engages said gear and causes the latter to move in synchrony therewith. A spring 406 extends from said pawl to a pin in sector 107, and exerts slight tension upon said pawl to urge it yieldingly into said gear 102.

A series of arms 113 depend from the dial shaft 101, in which are the detent pins 112. These detent pins remain in engagement with the gears 102, preventing them from back rotation while the sectors swing toward the front of the machine, allowing the teeth of the pawls 110 to pass over the teeth of the gears 102. Then just before the push bars can come in contact with the respective bushings 211 to push said digit slides toward the rear of the machine, these detent pins 112 are lifted from the gears 102 and said gears are then free to move in synchrony with said sectors. This disengagement of the detents is accomplished automatically by reason of the movement of the bail 328. This bail 328 swings to position shown in Fig. 6, just as the handle starts forward, locking all of the gears 102, and then it is elevated lifting the pins 112 before the racks 205 start toward the rear of the machine. The actuating means for accomplishing these movements will be described later herein. The spring 414 tends to hold the detent pins 112 into engagement with the gears 102.

*Carrying mechanism, or transfer mechanism.*—The carrying is accomplished by reason of the surplus movement of the slide 213.

Power is stored for this purpose in the tension spring 501. A carrying stop 115 for each dial is pivotally mounted upon the shaft 117, coöperating with each dial sector. A spring 405 holds same in normal position. This stop 115 has an ear 115ᵃ off set and extending toward the left of the machine (see Fig. 6ᴬ), which is adapted to arrest the movement of the stop arm 121. A finger 115ᵇ extends toward the right of the machine from arm 115, and carries the tripping pin 119 which normally lies in the path of travel of the carrying cams 106. As the push bars 208 force the racks 205 and the sectors 107 rearwardly when they have reached the desired point, the stop arm 121 contacts with ear 115ᵃ and arrests the swinging movement of said sector 107 and rack 205. A continued movement of the push bar 208 causes the spring 501 to open and push bar moves on slide 213 a distance equal to a one space movement of the dial. It will be readily seen that if the stop ear 115ᵃ be moved toward the rear of the machine and out of stopping contact with the stop arm 121, the sector will then swing an additional space farther than that which would be ordinarily imparted by reason of the regular movement of the digit slide. The carrying cams 106 are located near the left end of the dial space, and coöperate with the tripping pins 119, of the dial space of next higher denomination, back, allowing the stop arm 121 of the next higher denomination to swing an additional space, thus carrying ten from a lower denomination to a higher. If a carrying cam 106 passes the carrying point while the stopping arms are away from the stops 115ᵃ, for instance, in adding "8" and "8", then the carrying catch 118 supported on shaft 8 engages the ear 115ᵃ at the rearward limit of the movement imported to it by the carrying cam 106, and holds this ear 115ᵃ out of the path of travel of the stop arm 121 of the next higher denomination, until this arm swings around driven by its respective rack, thereby causing the dial of next higher denomination to move an extra space because of the withdrawal of stop 115ᵃ. When this stop arm 121 moves this additional space, the catch 118 is automatically disengaged from the ear 115ᵃ and the next time the handle is drawn forward, the carrying parts reset themselves or move into position for another carrying operation.

An important feature of my invention in this connection is that the carrying movement is not stored in any portion of the digit sliding member proper. In other words, there is a perfectly rigid connection between the stopping ears on the digit slide and the dials themselves, for if there were a slidable connection as is usually the case between the stopping or engaging portion of the digit setting mechanism and the dial actuators for storing carrying power, if the digit setting mechanism be drawn forward forcibly without a governor, the momentum of the parts would force the dial actuators forward against the tension of the carrying springs, at a critical time, and there would be overthrow of the digit actuating mechanism forward, causing the actuating mechanism to move the dials a space or so more than was required. In my invention it makes no difference how rapidly the digit sliding members are drawn forward, as the sectors and digit pawls cannot race ahead of the slides, being rigidly connected thereto.

A swinging frame composed of the rock shaft 326, the end pieces 338 (see detail in Fig. 20), and the shaft 328, is adapted to oscillate upon the axis of 326. In this frame are the locking arms 337 in the form of arcs, which, when swung upwardly, lock the ears of the digit pawls 110 firmly into the teeth of the gears 102 against movement in any direction. When so locked, it will be seen that it is impossible for the dials by racing ahead of the driving mechanism, the sectors, etc., to force the pawls 110 out of engagement with the teeth of the gears 102. By this reason, when the arms 121 suddenly stop against the stop 115ᵃ, the motion of the dials is checked positively as the pawls 110 are still securely locked into the teeth of the gear 102. Then again, if the handle be drawn forward and given an irregular movement toward the rear, if it were not for this positive lock in both directions, the dials would have enough movement imparted to them to cause them to race ahead of the driving mechanism and an incorrect digit would thus be added into the dial. The first movement of the operating handle unlocks all the digit pawls by dropping the locking frame into position shown in Fig. 6. Then the first rearward movement of said operating handle again locks the pawls before they start in their accumulating movement. Upon the shaft 117 is also mounted the arms 129, the function of which is to arrest the backward movement of the dials in the resetting operation, at the "0" point. A pin 125 in each dial coöperates with said arms for this purpose. This arm is necessary, otherwise an extra handle stroke would be required to properly position the carrying points before a resetting operation, as is the case with other well known adding machines, and as will be explained.

*Control mechanism.*—Upon the right side of the main accumulating mechanism, upon the outside of the end plate 2, is located the operating handle 335 and controlling devices. A shaft 357 extends through the machine, to which is rigidly secured the main driving sector 313. Axially and pivotally mounted upon this sector, is the plate 317.

Studs 321 are in sector 313, adapted to fit slotted openings in plate 317, as shown. This plate 317 may be swung to a limited extent upon the sector 313, because of the slots. A spring 507 extends from a stud in 317 to a similar stud in sector 313, tending to hold the parts normally in position shown in Fig. 2.

The handle hub 330 (Fig. 22) has ears adapted to fit an opening in the plate 317. A pawl 316 is provided with an ear adapted to bear against the plate 317 under tension of the spring 512 which is connected thereto. Spring 507 is of sufficient strength to overcome main driving spring 508, and when the handle is drawn forward easily, the plate 317 remains in the same relative position to the sector 313 as shown in Fig. 2. If, however, the handle be jerked forward, spring 507 will yield. Then the pawl 316 will engage notch 317$^a$ (see Fig. 2), the periphery of the sector 313 being cammed so that if the parts move together as shown, the pawl 316 remains inoperative, but if the plate 317 be forced ahead of sector 313, then the notch 317' is exposed and plate 317 is held in its extreme forward position until sector 313 catches up with it, and by reason of such cammed periphery of sector 313, releases the sector pawl 316 from the notch 317', and the main sector is then free to return. The object of the pawl 316 then is to force a complete movement at an even speed, no matter how rapidly the operating handle may have been jerked forward.

Figs. 2 and 27 show a form of governor well known in the adding machine art. 306 is the piston head, 305 the piston, 301 the base, 304 the cap, 308 a section of the bell crank which connects with it. In Fig. 27 oil or fluid is shown in said governor. As it is not essential to govern the mechanism of my invention on the forward stroke of the handle, a valve may be placed on the piston head 306, allowing the oil to circulate freely on the forward movement of the handle, governing only on the return movement thereof. 302 is the stud upon which this governor may oscillate. Fig. 2 shows a general view of the arrangement of the governor connections. A support 314 for the bell crank 308 is shown. The connecting link 312 is between the same and the main sector 313. The main spring 508 connects the sector 313 with the base of the machine by post or ear 36.

The main sector 313 has teeth 313$^a$ which coöperate with the reversing pawl 329 held in normal position by the spring 511. This reversing pawl compels a complete movement of said main sector 313, whenever it is started.

A bell crank 354 is pivotally mounted on the side plate 2, (see Fig. 2). In the forward extremity of this bell crank is a slot to receive the roller 346 on stud 349 on sector 313. The arc which this roller describes causes a movement of the bell crank 354, which in turn imparts movement to arms 350 hereinbefore referred to, by reason of the pitman 339. In this manner movement is imparted to the swinging frame comprised of the shaft 128, sides 350, shaft 325, etc., forming what is generally termed the "pick-up bail frame."

At the upper extremity of each of the arms 350 is pivotally attached the links 353. These links have at one end a slotted portion which receives ends of the rod 212, which passes through loops in the sliding grate 201. When the handle is at rest in normal position, these links draw the sliding grate 201 forward so that the locking edges in the same are free from the locking openings 200$^a$ of the key-stems. The moment the pick-up bail frame above referred to starts to swing forward, the locking grate 201 is allowed to slide rearwardly by virtue of the spring 520 (Fig. 4), thus locking all of the unoperated key-stems against depression. This sliding grate remains in this locking position until the pick-up bail nearly reaches its original position, by reason of the slots in the links 353; the latter portion of the stroke of the pick-up bail frame restores the grate to normal position.

Fig. 3 shows the control upon the left side of the main frame. 357 is the main operating shaft above referred to. Upon this is rigidly mounted on this side of the machine the arm 372 carrying the toggle pawl 373. When the handle is operated, this pawl swings upwardly, a nose thereof slightly contacting with the under side of the pin 374, and a continued movement of arm 372 causes the pawl 373 to pass beyond said pin 374. On the return movement of the arm 372, said toggle pawl 373 engages said pin 374 and a continued movement of the arm 372 toward normal position forces arm 376 rearwardly, thereby imparting a swinging movement to the arm 381, which is rigidly attached to the rock shaft 359. As the dead center between the main operating shaft 357, the pivot 373$^a$ and the pin 374 is passed, the arm 376 is easily allowed to assume its normal position again and the tip of toggle pawl 373 passes beyond the pin 374 and the parts again assume normal position, as shown. The spring 515 holds the toggle pawl 373 yieldingly in a central normal position, as shown. This movement just described causes the key-stem release bail 383, (Fig. 5) to swing rearwardly a distance sufficiently far to disengage all of the key-stems which may have been depressed and locked under the locking edges of the slots in plate 18. However, after being so released, the key-stems are not allowed to return entirely to normal position, but merely up to a point where the notch 200ᵃ in the same contacts with the under side of the locking grate 201. Then when the locking grate 201 is finally drawn forward at the latter part of the return stroke of the handle, the keys are finally released, when they return by a second impulse to normal position. Thus it will be seen that the key-stems are released from the engaging plate during the early part of the return movement of the handle, when they raise about one half of the distance, and that they are restored to their final position only as the handle reaches its return limit of motion. In this manner a great deal of noise is eliminated during the operation of the machine. In this connection, it will be noted that as the operating handle starts, the catches 210 engage the pin 221 and hold against the tension of the springs 500. When the slides 202 are forced rearwardly by the bail 383, as just described, the spring 502 on each catch yields, allowing the catch 210 to maintain its engagement with its respective pin. This of course occurs if no key-stem is depressed in that particular column. In a mechanism of this kind, this elastic connection between key-stem trip slide 202 and catch 210 is quite essential, as if the catches 210 were disconnected from the slides 204, the latter would jump forward when they should be retained. In other words, the spring 502 is the real connection between the trip slide 202 and catch 210.

A little in advance of the shaft 357 is pivotally mounted the arm 368 carrying the pin 369. At the lower extremity of this swinging arm is the roller 361 adapted to coöperate with the cam lever 364. Pivotally mounted upon a forward projection from the arm 372 at pivot 389 is the tongued pawl 387 held in a central normal position by the spring 521. As the arm 372 advances toward the front of the machine, this pawl 387 contacts with pin 369 at the upper extremity of the arm 368, which in turn forces the roller 361 backwardly, allowing the forward end of the lever 364 to drop suddenly. As this pawl 387 advances toward the limit of its forward motion, the under side of the same engages the lower pin 369, so that the early portion of the return movement of the arm 372, again forces the roller 361 back to position shown in Fig. 3. The arm or lever 364 is loosely mounted upon the shaft 326 and is held in position by the screw 303, Fig. 3. A finger 363 is attached to the left side piece 338 of the locking frame referred to, to the lower extremity of which finger is attached the spring 522, which extends upwardly to the forward end of the lever 364. The pin 366 in the arm 338 rests against the lock lever 364 by the tension of the spring 522. This spring is of sufficient tension to elevate the locking frame referred to. Its function is to prevent damage should any one of the pawls 110 become caught in any manner upon the top of any tooth of the gear 102, in which case of course the frame could not swing upwardly until the pawl slipped into its proper notch. If it were not for this yielding connection the action of the roller 361 might strain the parts coöperating therewith.

An auxiliary key-stem release button 353 has been provided on the left side of the machine. This is not necessary, as I have provided a releasing lever in conjunction with the operating handle, hereinafter referred to. The key-stem 355 connects with an arm of the bell crank 356. To the upper extremity of this bell crank 356 and extending from the upper end of the arm 381 is the connecting link 385. When key-stem 355 is depressed by reason of these connections, the release bail 383 (Fig. 5) is forced rearwardly, thus releasing all of the depressed keys of the main keyboard.

*Key-stem release and dial resetting mechanism.*—358 is a shaft extending through the machine near the shaft 357. Upon the right side of the machine attached to this shaft is the finger 392. Upon the other extremity of said shaft is the arm 395 having a pin to coöperate with an opening in the sliding piece 343. By reference to the main operating handle, (Figs. 21, 22, 23 and 24) it will be noted the hub 330 has ears to enter the opening in the plate 317, as stated. Loosely mounted upon this hub and attached to the releasing lever 393 is the hub 394 formed as shown. This lever is adapted to be moved upon the hub 330 as its bearing, against the tension of the spring 514. When the handle is in normal position and this lever 393 is forced toward said handle, an ear 394ᵃ contacts with the finger 392 causing the shaft 358 to rock. This in turn forces the slide 343 downwardly by reason of the arm 395 and its connection. 343ᵇ is a rearwardly extending finger on slide 343, which can be seen in Fig. 3 in dotted lines, and this is adapted to abut a projection from the bell crank 356, as shown, so that when slide 343 is forced downwardly, it also forces the bell crank 356 with it, thus releasing all the key-stems if any are depressed, and also raises all of the catches 210 from possible engagement with the pins 221. Under which condition, if the handle happened to be operated, all of the racks would be free to advance forward, there being no retaining pawls to hold them. When said slide 343 is in depressed position, its lower extremity contacts with the point 364ᵃ of lock lever 364, thus preventing the locking frame from dropping when the roller 361 is forced out. Thus the digit pawls 106 remain locked into their respective gears 102, and when the racks go forward at the actuating of the operating handle, the gears must turn backwardly, thereby rotating the dials backwardly. These dials are free to turn backwardly until the pins therein 125 contact with the pawls or catches 129. This arrests the slides coöperating with the respective dials. Thus, if a dial shows a "5" upon its face, in rotating rearwardly, it turns five spaces before such contact as just described, where it and its respective rack is arrested. The pick-up bail 325 then proceeds to the front of the machine just the same as if a "5" had been set up in the keyboard.

The releasing lever 393 will be found a great advantage in releasing depressed keys in the keyboard, especially in the operation of multiplication when the multiplier consists of more than one digit. This releasing lever 393 being located in proximity to the operating handle, enables an operator to handle all operations of the machine with one hand in the most rapid manner.

From the foregoing description, it will be seen that should the operating handle be drawn forward while the releasing lever was moved toward said handle, the dials would rotate backwardly to the "0" point, thus it will be readily seen that no special clearing button is necessary.

By reference to Fig. 2, 331 is a blade spring attached to plate 317 and arranged to coöperate with a suitable notch in the side of the hub 330. The object of this spring is to retain the handle in operative position on the shaft 357, which extends toward the right side of the machine inside of the hub 330.

It will be further noted that when the handle is drawn forward, all of the mechanism will have become securely locked, and in this condition by removing the handle from the machine, it will be impossible to tamper with it in any manner. This will be found very convenient when adding a list, if the operator desires to leave his machine he may "set up" the last item in the keyboard, draw the handle partially forward, and remove the same from the machine. This will assure him that his total has not been changed, and also shows him just what his last item was.

When the arm 372 starts and the slide 343 is depressed a pin 343ª on slide 343 is engaged by the under side of a cam 371 attached to the arm 373 which holds the slide 343 in such depressed position while the dials are being rotated backwardly. However, after the positioning of such dials at "0" and at the extreme forward end of the handle stroke, the pin 343ª is released from under the cam 371, thereby unlocking all of the pawls 110, as the locking frame 338 drops, and the racks 205 and slides all plunge to the front of the machine. It will be readily seen that the pawls are about to engage the gears 102 when in this position, if forced rearwardly, thus causing the dials to rotate forwardly again. However, suitable stops are so arranged that all of the racks except that of the first column jump forward a distance sufficient so that the pawls will have engaged the ninth tooth of the respective gears 102. The rack for the first column jumps forward a distance sufficient to engage the tenth tooth, so that in the process of rotation forward, when the handle returns in this resetting operation, all of the dials rotate forward to the "9" point with the exception of the first, which turns to the "0". This carries over into each denomination toward the right, and leaves all the dials set at "0". In other words, the dials are turned to the "9" point and then a number added to them sufficient to again leave them at "0", and in this manner mechanism to produce a relatively reverse movement of the operating parts is avoided, and the resetting is accomplished by subtraction first, of the proper amount, and then by addition.

I provide means to insure full and accurate operation of the keys of the machine. It will be noted that if a key-stem in any column be depressed but slightly, it is possible that the locking grate 201 will engage the portion of the key-stem between the two notches and thus prevent any of the key-stems from becoming locked. This slight movement might be sufficient to elevate the catch pawl 210 and allow this particular digit slide to go forward when the operating handle is pulled. As there would be, under such a condition, nothing to stop such slide, it would go forward to its limit, thereby setting up "9" in all columns but the first, and "10" in the first column. Then, if a button, a number "1", of low denomination be depressed to its limit, it would be locked down as the grate would slide in behind the locking portion. The stopping ears 204ᵈ on the digit slide being in front of the key-stem of low denomination, when the handle is forced rearwardly, the stop 204ᵈ would abut the key-stem on the front side instead of on the rear, and the result would be that the machine would become locked against any further movement until the parts have been rearranged. To prevent such an accidental operation, which also might produce an erroneous result in the accumulations, I have provided the levers 390 and 391 pivotally mounted upon the right side of the frame. An ear 391ª on lever 391 is in the path of travel of the sector 313, unless the locking grate 201 shall have made its proper locking movement. If this movement be arrested for any reason, such as an improper depression of a key-stem, it will be impossible to draw the operating handle forward. The operator will be able to do absolutely nothing with the machine unless he first either raise the key improperly depressed, or push the same downwardly to its proper position, which of course unlocks the machine.

I have shown the machine in the form I know to be effective, from experience in the operation of same, but I desire to say, as already intimated in the specification, that details of the structure can be greatly modified without departing from my invention.

Having thus described my invention, what I claim as new and desire to secure by Letters Patent is:

1. In a calculating machine, the combination of a series of accumulating dials; reciprocating actuating members therefor; a series of depressible key stems for limiting the movement of said reciprocating actuating members, having stops for said reciprocating members; two beveled parts on said key-stems, one above the other and an engaging portion between them; the upper beveled part projecting beyond said engaging portion; a plurality of notches in each stem; and a slidable locking plate to coöperate with said notches in said key-stems when the latter are in either a normal or a depressed position and coact with said beveled portions whereby the complete depression of any key releases the others by the action of said upper bevel, substantially as described.

2. In a calculating machine, the combination of a series of dials; reciprocating members for actuating the same; a series of depressible key-stems for limiting the movement of said reciprocating members in one direction, said key-stems having a plurality of beveled portions, one above the other, and an engaging portion between them; the upper beveled part projecting beyond said engaging portion, and a lock means to coact with said engaging portions and coact with said beveled portions whereby the complete depression of any key releases the others by the action of said upper bevel, substantially as described.

3. In a calculating machine, the combination of a series of accumulating dials; reciprocating members for actuating the same; depressible key-stems for limiting the movement of said reciprocating members, said key-stems having two beveled portions, and an engaging portion and a lock means to coact with said engaging portions and coact with said beveled portions, whereby the complete depression of any key releases the others by the action of said upper bevel, for the purpose specified and substantially as described.

4. In a calculating machine, the combination of a series of dials; reciprocating actuating members therefor; depressible key-stems for limiting the movement of said actuating members, said key-stems having two beveled portions one above the other, with an engaging portion between them; the upper beveled part projecting beyond said engaging portion; a plate having openings to receive said key-stems, one edge of which openings being adapted to coöperate with beveled and engaging portions of said key-stems; a spring for returning said key-stems to normal positions, and to exert a tension between said beveled and engaging portion of said key-stems, and the edge of the openings in said plate, whereby the depression of any key releases the others by the action of said upper bevel, for the purpose specified and substantially as described.

5. In a calculating machine, the combination of a series of accumulating dials; reciprocating actuating members therefor; depressible key-stems for limiting the movement of said actuating members; beveled edges on said key-stems; an engaging portion on said key-stems; a plate having the edge arranged to coöperate with the beveled edges of said key-stems and the engaging portion of said key-stems; and a spring to tension said beveled edges and engaging portion of said key-stems against said edges of said plate, whereby the depression of any key releases the others by the action of said upper bevel, substantially as described.

6. In a calculating machine, the combination of a series of dials; reciprocating actuating members therefor; depressible key-stems for limiting the movement of said actuating members; two bevels on said key-stems, one at a greater angle than the other, with a latching portion between them; a stop on said key-stem to limit the depression thereof; a plate having its edges arranged to coöperate with said beveled and latching portions of said key-stems; and a spring for tensioning said beveled and latching portions against the edge of said plate, whereby the depression of any key releases the others by the action of said upper bevel, substantially as described.

7. In a calculating machine, the combination of a series of accumulating dials; reciprocating actuating members therefor; key-stems for limiting the movement of said actuating members; a latching means for holding said key-stems in depressed positions; means for imparting a slight rearward movement to the lower extremity of said key-stems as the latter approach latching point; and means for imparting a still greater rearward movement to the lower extremity of said key-stems as the latter are forced to the limit of their depressions, substantially as described.

8. In a calculating machine, the combination of a series of accumulating dials; reciprocating actuating members therefor; key-stems in numeral series for limiting the movement of said actuating members; means for latching any one of said key-stems in the same series when depressed to a predetermined point; and means for disengaging any latched key-stem in said series arranged to be actuated by the depression of any other key-stem of the same series beyond said predetermined latching point.

9. In a calculating machine, the combination of accumulating mechanism; reciprocating members for actuating the same; depressible key-stems arranged in numeral series for limiting the movement thereof; a fixed plate having openings to receive said key-stems; latching portions on said key-stems adapted to be engaged by the edges of said openings in said fixed plate; and means for disengaging said key-stems when engaged by the edges of said plate, during the operation of said reciprocating actuating members, substantially as described.

10. In a calculating machine, the combination of accumulating mechanism; reciprocating members for actuating the same; depressible key-stems arranged in numeral series with stop means for limiting the movement of said actuating members; a fixed plate; latching portions on said key-stems adapted to engage said plate when said key-stems are depressed; and means for moving said key-stems out of engagement with said plate during the operation of said reciprocating actuating members, substantially as described.

11. In a calculating machine, the combination of accumulating mechanism; reciprocating members for actuating the same; depressible key-stems for limiting the movement of said actuating members; a fixed plate; latching portions on said key-stems adapted to engage said plate when said key-stems are depressed; and means for moving said key-stems out of engagement with said plate independent of the operation of said reciprocating actuating members.

12. In a calculating machine, the combination of a series of accumulating dials; actuating members therefor; and depressible keys with stems for limiting the movement of said actuating members, each of said key stems independently having a plurality of operative movements, one at angle to the other.

13. In a calculating machine, the combination of a series of accumulating dials; actuating members therefor; depressible keys with stems for limiting the movement of said actuating members, said key-stems each having a vertical and horizontal operative movement when depressed by an operation; and an operating handle for operating said actuating members.

14. In a calculating machine, the combination of a series of accumulating dials; reciprocating members for actuating said dials; key-stems for limiting the movement of said reciprocating members; notches in said key-stems; a sliding plate adapted to enter said notches and to lock said key-stems when said key-stems are in either normal or operative positions; an operating handle connection between the same and said reciprocating members; an arm having an abutting projection normally in the path of travel of said operating handle; connections between said arm and said sliding plate whereby the moving of said plate into said notches in said key-stems will move said arm out of the path of travel of said operating handle, substantially as described.

15. In a calculating machine, the combination of a series of accumulating dials; reciprocating mechanism for actuating said dials; key-stems for limiting the movement of said reciprocating mechanism; a plate for locking said key-stems against depression; an operating handle; connections between said handle and said locking plate; an arm normally in the path of travel of said operating handle; connections between said arm and said locking plate whereby the movement of said plate into locking position with reference to said key-stems, moves said arm out of the path of travel of said operating handle, substantially as described.

16. In a calculating machine, the combination of a series of accumulating dials; reciprocating members for actuating the same; key-stems in numeral series for limiting the movement of said actuating members; a latching means for holding said key-stems in depressed positions; means for imparting a slight rearward movement to the lower extremity of said key-stems as the latter approach latching point; means for imparting a still greater rearward movement to said extremity of said key-stems, when the latter are forced to the limit of their depressions; a sliding bar for each series of key-stems adapted to be actuated by said rearward movement of said key-stems; a latch for retaining each of said reciprocating members against operative movement when no coöperating key-stem is depressed; connections between said sliding bars and said latches; and engaging portions on said sliding bars for disengaging any depressed key-stems of its coöperating series, when the movement of said sliding bar exceeds the movement imparted to it by the depression of any key-stem of its series to latching point, substantially as described.

17. In a calculating machine, the combination of a series of accumulating mechanisms; reciprocating members for actuating the same; key-stems arranged in numeral series for limiting the movement of said reciprocating actuating members, said key-stems having a movement at an angle to the depression thereof; latches for arresting the movement of said reciprocating members when no key-stem of its coöperating series is depressed; a sliding member actuated by said angular movement of said key-stems; and connections between said sliding members and said arresting latches, substantially as described.

18. In a calculating machine, the combination of accumulating dials; actuating members therefor; depressible key-stems in numeral series for limiting the movement of said actuating members; check pawls for arresting said actuating members when no key-stems are depressed; bevels on said key-stems for imparting to the same a movement at an angle to the movement of depression; and contact connections between said key-stems and said check pawls whereby the angular movement of the former moves the latter out of arresting engagement with said actuating members, substantially as described.

19. In a calculating machine, the combination of a series of accumulating dials; reciprocating actuating members therefor; key-stems arranged in numeral series for limiting the movement of said reciprocating actuating members; means for moving said key-stems into latched depressed positions; check pawls for arresting said reciprocating actuating members against operative movement when no key-stem of its respective series is depressed; a sliding member for releasing said key-stems from said latched depressed positions; and a yielding connection between said sliding members and said check pawls respectively, substantially as described.

20. In a calculating machine, the combination of a series of accumulating dials; reciprocating actuating members therefor; key-stems arranged in numeral series for limiting the movement of said reciprocating members; means for latching said key-stems in depressed positions; check pawls for arresting the movement of said reciprocating members when no key-stem of its respective series is depressed; a sliding member for releasing said key-stems from said latched positions; and a yielding connection between said sliding members and said check pawls respectively, substantially as described.

21. In a calculating machine, the combination of accumulating mechanism; reciprocating members for actuating the same; a lever for operating said reciprocating actuating mechanism; depressible key-stems for limiting the movement of said reciprocating actuating members; a fixed plate; latching portions on said key-stems adapted to engage said plate when said key-stems are depressed; and means for moving said key-stems out of engagement with said plate independent of the operation of said operating lever, substantially as described.

22. In a calculating machine, the combination of accumulating mechanism; reciprocating members for actuating the same; a lever for operating said reciprocating mechanism; depressible key-stems in numeral series for limiting the movement of said reciprocating members; a fixed plate; latching portions on said key-stems adapted to engage said plate when said key-stems are depressed; and means for moving said key-stems out of latching engagement with said plate, consisting of a sliding bar adapted to contact with the key-stems of each series, a releasing lever axially mounted with said operating lever and connections between said releasing lever and said sliding bars, substantially as described.

23. In a calculating machine, the combination of accumulating mechanism; reciprocating members for actuating the same; a lever for operating said reciprocating actuating members; depressible key-stems arranged in numeral series for limiting the movement of said reciprocating members; a fixed plate; latching portions on said key-stems adapted to engage said plate when said key-stems are depressed; and means for moving said key-stems out of latching engagement with said plate, consisting of a sliding member adapted to contact with all of the key-stems of each series, a releasing lever, and connections between said releasing lever and said sliding members, substantially as described.

24. In a calculating machine, the combination of accumulating mechanism; reciprocating actuating members for actuating the same; depressible key-stems for limiting the movement of said reciprocating members; means for locking said key-stems in depressed position; an operating handle for operating said reciprocating actuating members; a releasing lever mounted axially with said operating handle; and connections between said releasing lever and said key-stems, substantially as described.

25. In a calculating machine, the combination of accumulating mechanism; reciprocating actuating members for actuating the same; depressible key-stems for limiting the movement of said reciprocating members; means for locking said key-stems in depressed position; an operating handle for operating said reciprocating actuating members; a releasing lever carried by said operating handle; means for releasing said key-stems from depressed position; and connections between said releasing means and said releasing lever, substantially as described.

26. In a calculating machine, the combination of accumulating mechanism; reciprocating actuating members therefor; depressible key-stems for limiting the movement of said reciprocating members; means for locking said key-stems in depressed position;

an operating handle for operating said reciprocating actuating members; a release lever mounted near said operating handle; means for releasing said key-stems from depressed position; and connections between said releasing means and said lever, substantially as described.

27. In a calculating machine, the combination of a series of accumulating dials; reciprocating members for each of said dials connected therewith, comprising a plurality of parallel bars having projections arranged in staggered relation to each other laterally, and a rack rigidly secured to said parallel bars; and key-stems having angular projections to coöperate with said projections on said parallel bars respectively, substantially as described.

28. In a calculating machine, the combination of a series of accumulating dials; reciprocating members for each of said dials, comprising a plurality of parallel bars having projections arranged in staggered relation to each other laterally, a rack rigidly secured to said parallel bars, toothed members always in mesh with said racks, dogs carried by said toothed members, and means for operatively engaging said dogs with said dials; and key-stems having angular projections to coöperate with the said projections on said parallel bars respectively, substantially as described.

29. In a calculating machine, the combination of accumulating dials; reciprocating actuating members therefor; key-stems for limiting the movement of said reciprocating members in one direction; and a single means for moving said reciprocating actuating members until arrested by said key-stems, and for returning said reciprocating actuating members to normal positions, substantially as described.

30. In a calculating machine, the combination of a series of accumulating dials; reciprocating members for actuating said dials; engaging mechanism connected to said reciprocating members for engaging said dials; key means for limiting the movement of said reciprocating members in one direction; stops on said reciprocating members to coöperate with said key means; a rigid non-slidable connection between said stops and said engaging mechanism; an operating handle and connections between said handle and said reciprocating members, substantially as described.

31. In a calculating machine, the combination of a series of accumulating dials; reciprocating members for actuating said dials; key means for governing the movement of said reciprocating members in one direction; stops for limiting the movement of said reciprocating members in the other direction; an operating handle; connections between said operating handle and said reciprocating members; means carried by said connections between said operating handle and said reciprocating members for imparting to said reciprocating dial actuating members a movement additional to that allowed by their respective coöperating key means; and means rotating in synchrony with said dials for rendering operative said means for imparting said additional movement to said reciprocating members, substantially as described.

32. In a calculating machine, the combination of a series of accumulating dials; reciprocating members for driving the same; an operating handle for governing the movement of said reciprocating members; key stops adapted to be abutted by said reciprocating members and to limit the movement of the latter; connections between said operating handle and said reciprocating members; means carried by said connections for imparting to said dials a movement in addition to that normally imparted by said reciprocating members as limited by said key-stems; and means moving in synchrony with said dials for rendering said means for so imparting additional movement, operative, substantially as described.

33. In a calculating machine, the combination of an accumulating dial and means for operating the same, comprising a sliding member having upwardly extending ears arranged in a plurality of rows, staggered in relation to each other laterally; key-stems arranged in numeral series centrally located between said rows of ears and having angular projections to coöperate with said ears on said sliding members; gears for actuating said dials, and sectors mounted axially with said gears; dogs mounted upon said sectors adapted to engage the teeth of said dial actuating gears; means for locking said dogs into engagement with said dial actuating gears, during the movement of said sliding members in one direction; and racks rigidly secured to said sliding members and adapted to mesh with said sectors, substantially as described.

34. In a calculating machine, the combination of accumulating dials; gears for driving said dials; swinging members carrying dogs adapted to positively engage said dial driving gears during the movement of said swinging members; slidable members for actuating said swinging members; key-stems for checking the movement of said sliding members in one direction; an operating handle, and means connected to said handle for moving said slidable members in both directions, substantially as described.

35. In a calculating machine, the combination of accumulating dials; swinging members carrying dogs adapted to positively drive said dials during the movement of said swinging members; slides for actuating said swinging members; key-stems to check the movement of said slides in one direction; an operating handle; and means connected to said handle for moving said swinging members in both directions, substantially as described.

36. In a calculating machine, the combination of accumulating dials; gears for rotating said dials; slidable members; connections between said slidable members and said gears respectively; means for locking said slidable members and said gears against any relative movement between them, during the movement of said slidable members in one direction; key-stems for limiting the movement of said slidable members; and a single means for operating said slidable members in both directions.

37. In a calculating machine, the combination of accumulating dials; reciprocating actuating members therefor; means for locking said reciprocating actuating members and said dials respectively against any relative movement between them; and a single means for moving said reciprocating members in both directions.

38. In a calculating machine, the combination of accumulating dials; reciprocating actuating members therefor; means for locking said reciprocating actuating members and said dials respectively against any relative movement between them; key-stems for limiting the movement of said reciprocating members in one direction; and a single means for moving said reciprocating actuating members until arrested by said key-stems, and for returning said reciprocating actuating members to normal positions, substantially as described.

39. In a calculating machine, the combination of accumulating dials; reciprocating members for actuating the same; dogs pivotally mounted on said reciprocating members and adapted to positively lock the latter and said accumulating dials against any relative movement between them; pivoted segments mounted in proximity to said dogs and adapted to hold said dogs in locking connection with said reciprocating members; an operating handle means connected to said handle for moving said reciprocating members in both directions; and means controlled by said handle for moving said segments into positions where the latter hold said dogs in said locking engagement with said dials, substantially as described.

40. In a calculating machine, the combination of accumulating dials; rotatable members connected therewith; sectors pivotally mounted axially with said rotatable members; dogs carried by said sectors and adapted to engage said rotatable members; segments pivotally mounted for holding said dogs into said engagement with said rotatable members; an operating handle; connections between the same and said pivotally mounted sectors carrying said dogs; and means controlled by said operating handle for moving said segments into positions for holding said dogs into engagement with said rotatable members, substantially as described.

41. In a calculating machine, the combination of accumulating dials; reciprocating means for actuating the same; means carried by said reciprocating means for locking the latter and said dials against any relative movement between them; movable members for holding said locking means carried by said reciprocating means in locking engagement with said dials; an operating handle; connections between the same and said reciprocating means for moving said reciprocating means in both directions; and means controlled by said operating handle for moving said movable members for holding said locking means into engagement with said dials, substantially as described.

42. In a calculating machine, the combination of accumulating dials; reciprocating means for actuating the same; means carried by said reciprocating means for locking the latter and said dials against any relative movement between them; movable members for holding said locking means in locking engagement with said dials; an operating handle; connections between the same and said reciprocating means; and means controlled by said operating handle for moving said movable members for holding said locking means into engagement with said dials, substantially as described.

43. In a calculating machine, the combination of accumulating dials; reciprocating actuating members therefor; a yielding connection between said reciprocating actuating members and said dials when said reciprocating members move away from normal positions; means for locking said reciprocating members and said dials against any relative movement between them during the movement of said reciprocating members toward normal positions; an operating handle; and means connected to the same for moving said reciprocating members both away from and toward normal positions.

44. In a calculating machine, the combination of a series of accumulating dials; reciprocating members for actuating the same; key means for limiting the movement of said reciprocating members; a swinging frame carrying a series of stop bars adapted to coöperate with said reciprocating members respectively, said stop bars having recesses therein; projections from said dial actuating members adapted to normally enter said recesses in said bars; and a tension spring between said dial actuating members and said stop bars, for the purpose specified, and substantially as described.

45. In a calculating machine, the combination of a series of accumulating dials; actuating members therefor; key-stems to limit the movement of said actuating members; a movable frame for operating said dial actuators; and a detent yieldingly connected between said movable frame and said dial actuating members, substantially as described.

46. In a calculating machine, the combination of a series of accumulating dials; actuating members therefor; key means to limit the movement of said actuating members; a movable frame for operating said dial actuating members; and a spring and stop connection between said moving frame and said dial actuators, substantially as described.

47. In a calculating machine, the combination of a series of accumulating dials; actuating members therefor; key means to arrest the movement of said dial actuators in one direction; a series of bars adapted to move in synchrony to coöperate with said dial actuators respectively; means carried by said bars of compelling a movement of said dial actuators in synchrony with said bars until the movements of said dial actuators are arrested by said key means; an operating handle and connections between the same and said series of bars, substantially as described.

48. In a calculating machine, the combination of a series of accumulating dials; actuating members therefor; key means to arrest the movements of said actuating members; a movable frame having a series of stopping portions to coöperate with said actuating members respectively; a spring connection between said movable frame and said dial actuators; and means for imparting to said movable frame a to-and-fro movement, substantially as described.

49. In a calculating machine, the combination of a series of accumulating dials; actuating reciprocating members therefor; means for limiting the movement of said dial actuators in one direction; means for reciprocating said dial actuators, consisting of a movable frame and a spring and detent connection between said frame and said dial actuators respectively, substantially as described.

50. In a calculating machine, the combination of a series of accumulating dials; actuating reciprocating members therefor; means for limiting the movement of said dial actuators in one direction; means for reciprocating said dial actuators consisting of a movable frame and a spring connection between said frame and said dial actuators respectively, substantially as described.

51. In a calculating machine, the combination of a series of accumulating dials; reciprocating members connected therewith; means for limiting the movement of said reciprocating members in one direction; a movable frame for actuating said reciprocating members in both directions; an operating handle; and suitable connections between the same and said movable frame, substantially as described.

52. In a calculating machine, the combination of a series of accumulating dials; dial actuating mechanism connected therewith; reciprocating members having stopping projections; key means to coöperate with said stopping projections to limit the movement of said reciprocating members in one direction; a rigid non-slidable connection between said stopping projections and said dial actuating mechanism; a frame having a definite movement; a spring and stop connection between said frame and said reciprocating members respectively, for moving the latter in both directions, substantially as described.

53. In a calculating machine, the combination of a series of accumulating dials; reciprocating members for actuating said dials; key means for limiting the movement of said reciprocating members in one direction; stopping projections on said reciprocating members to coöperate with said key means; movable stops to limit the movement of said reciprocating members in the other direction; a frame for moving said reciprocating members, having a movement in excess of that required to normally operate said reciprocating members; spring and contact connections between said frame and said reciprocating members for operating the latter in both directions, substantially as described.

54. In a calculating machine, the combination of a series of accumulating dials; reciprocating members for actuating said dials; key means for limiting the movement of said reciprocating members in one direction; movable stops for limiting the movement of said reciprocating members in the other direction; a frame for controlling the movements of said reciprocating members, having a movement in excess of that required to restore said reciprocating members against said limiting movable stops; and a spring and stop connection between said controlling frame and said reciprocating members, substantially as described.

55. In a calculating machine, the combination of a series of accumulating dials; reciprocating members having stopping projections for actuating the same; key means for limiting the movement of said reciprocating members in one direction, and coöperating with said stopping projections; movable stops for limiting the movement of said reciprocating members in the other direction; means for moving said movable stops and allowing a further movement to said reciprocating members than normal, consisting of a cam rotating in synchrony with said dials; a frame for moving said reciprocating members having stopping projections; and a spring and stop connection between said frame and said reciprocating members, substantially as described.

56. In a calculating machine, the combination of a series of accumulating dials; reciprocating members for driving said dials; a handle for actuating said reciprocating members; stops for governing the normal movement of said reciprocating members; means for imparting to said dials a movement in addition to that allowed by said governing stops; and means arranged between said handle and reciprocating member for storing power for actuating said means for imparting such additional movement to said dials, independent of said reciprocating members or said dials.

57. In a calculating machine, the combination of accumulating dials; rotatable members connected therewith; toothed sectors pivotally mounted axially with said rotatable members; dogs carried by said sectors adapted to engage said rotatable members and lock said sectors and said rotatable members against any relative movement between them; racks always in mesh with said sectors; an operating handle; connections between said rack and said operating handle for moving said racks in both directions; segments pivotally mounted in proximity to said dogs and adapted to hold said dogs in engagement with said rotatable members; and means controlled by said operating handle for moving said segments into positions for holding said dogs into engagement with said rotatable members, substantially as described.

58. In a calculating machine, the combination of accumulating dials; sectors pivotally mounted in fixed axial relation to said dials; means for positively locking said sectors and said dials against any relative movement between them; an operating handle; a single means connected to said handle for swinging said arms in both directions, substantially as described.

59. In a calculating machine, the combination of accumulating dials; swinging members pivotally mounted in fixed axial relation to said dials; means for positively locking said swinging members and said dials against any relative movement between them; and a single means for swinging said members in both directions.

60. In a calculating machine, the combination of accumulating dials; swinging members pivotally mounted in fixed axial relation to said dials; means for positively locking said swinging members and said dials against any relative movement between them; key means for limiting the movement of said swinging members in one direction; an operating handle; and a single means connected to said operating handle for moving said swinging members until arrested by said key means and for restoring said swinging members to normal position.

61. In a calculating machine, the combination of accumulating dials; swinging members pivotally mounted in fixed axial relation to said dials; means for positively locking said swinging members and said dials against any relative movement between them; key means for limiting the movement of said swinging members in one direction; an operating handle; and means connected to said handle for moving said swinging members until arrested by said key means, and for restoring said key means to normal position.

62. In a calculating machine, the combination of a series of accumulating dials; arms pivoted in fixed axial positions thereto; connections between said arms and said dials; reciprocating members connected to said pivoted arms; key means to limit the movement of said reciprocating members; a frame having a to-and-fro movement; means for actuating said frame having a to-and-fro movement; and connections between said frame having a to-and-fro movement and said dial actuators for moving said dial actuators in both directions, substantially as described.

63. In a calculating machine, the combination of a series of accumulating dials; members rotating in synchrony therewith; dogs mounted upon swinging arms for engaging said rotatable members; an actuating shaft; an arm on said actuating shaft; pivoted segments for locking said dogs into engagement with said rotatable members; connections between said arm on said actuating shaft and said pivoted segments, whereby, when said shaft starts its movement away from normal, said segments move into unlocking relation to said dogs, and when said shaft starts toward normal position, said segments are moved into locking relation with said dogs, substantially as described.

64. In a calculating machine, the combination of a series of accumulating dials; dogs for rotating the same; an operating handle for actuating said dogs; means governed by said handle whereby, when said handle starts away from normal, said dogs are unlocked from driving connection with said dials, and when said handle starts on its return movement toward normal, said dogs are locked into rotating engagement with said dials, substantially as described.

65. In a calculating machine, the combination of accumulating dials; rotatable members connected therewith; reciprocating racks; sectors always in mesh with said racks; an operating handle and means of unlocking said sectors from said rotatable members during the early movement of said sectors and said rotatable members against any relative movement between them during the early part of the return movement of said handle, substantially as described.

66. In a calculating machine, the combination of a series of accumulating dials; rotatable members connected therewith; sectors mounted axially of said rotatable members; dogs carried by said sectors for engaging said rotatable members; racks always in mesh with said sectors; stepped projections carried by said sectors; movable stops normally adapted to arrest the movement of said sector stepped projections at the first step thereof; cams rotating with said dial rotatable members adapted to move said movable stops when the respective dials pass the "carrying" point, so that said movable stops will arrest said sectors at the second point of said stepped projections; catches for engaging said movable stops when moved by said cams until said stops are in position to engage the said second point of said stepped projections; means for automatically disengaging said catches from said movable stops when said projections from said sectors are arrested at the second step thereof; and means for actuating said sectors consisting of a reciprocating frame having a fixed movement in each direction and a spring and detent connection between said reciprocating frame and said sectors, substantially as described.

67. In a calculating machine, the combination of a series of accumulating dials; rotatable members connected therewith; reciprocating members for actuating said dials; normal stops on said dial actuating members; movable abutting members for arresting said stops on said dial actuators; cams adapted to move said abutting members out of the path of travel of said stops on said dial actuators; a secondary stop for arresting said dial actuators when said abutting members are out of the path of travel of said dial actuators; catches for holding said abutting members out of the path of travel of said normal stops on said dial actuators; means for automatically disengaging said catches for said abutting members when said secondary stops become operative; and yielding means for forcing said dial actuator stops against said abutting members, substantially as described.

68. In a calculating machine, the combination of a series of accumulating dials; reciprocating actuating members therefor; key means arranged in numeral series to correspond with said dials for limiting the movement of said reciprocating members in one direction; movable stops for limiting the movement of said reciprocating members in the other direction; means for moving said movable stops, thereby allowing said reciprocating members to move a distance one space in advance of that determined by its coöperating key-means, when a dial of lower denomination passes the "carrying" point; a non-yielding contact connection between said reciprocating members and said key means respectively, when the latter arrest said reciprocating members; a frame having a definite movement; and a yielding connection between said frame and said reciprocating members in both directions, substantially as described.

69. In a calculating machine, the combination of a series of accumulating dials; dial actuating mechanism adapted to be engaged and disengaged therefrom; reciprocating members having stopping projections; key means coöperating with said stopping projections to limit the movement of said reciprocating members in one direction; a rigid non-slidable connection between said stopping projections and said dial actuating mechanism; a frame having a definite movement; and yielding connections between said frame and said reciprocating members respectively, for moving the latter in both directions, substantially as described.

70. In a calculating machine, the combination of a series of accumulating dials; key means for limiting the normal accumulation upon said dials; reciprocating members having stops coöperating with said key means; a movable frame for operating said reciprocating members; and means for imparting to each dial a movement in addition to that called for by its coöperating key means when a dial of next lower denomination passes the "carrying" point, consisting of a movable stop, a cam for moving said stop and a spring and stop connection between said movable frame and said reciprocating members having stops, substantially as described.

71. In a calculating machine, the combination of a series of accumulating mechanism; a frame for actuating said accumulating mechanism; key means for limiting the movement of said accumulating mechanism; an operating handle; an operating shaft; two plates mounted upon said shaft, one rigidly and the other loosely; a spring and stop connection between said plates; a governing means attached to said rigidly mounted plate; connections between said rigidly mounted plate and said actuating frame; connections between said loosely mounted plate and said operating handle; a pawl adapted to ride upon the periphery of said loosely mounted plate; a notch in said loosely mounted plate to receive said pawl; an elevating cam on said rigidly mounted plate normally covering said notch on said loosely mounted plate and preventing said pawl from entering the same while said plates maintain the same relative position to each other, substantially as described.

72. In a calculating machine, the combination of an accumulating mechanism; actuating means therefor; key means for limiting the movement of said actuating means; an operating shaft; two plates mounted thereon, one rigidly and the other loosely; a spring and stop connection between said plates; a governing means attached to said rigidly mounted plate; connections between said rigidly mounted plate and said accumulating mechanism actuating means; an operating handle to engage said loosely mounted plate; a spring for returning said rigidly mounted plate to normal position; means for compelling a complete movement of said rigidly mounted plate in both directions; and means for preventing a return movement of said loosely mounted plate while same is forced out of normal relation to said rigidly mounted plate, substantially as described.

73. In a calculating machine, the combination of an accumulating mechanism; actuating mechanism therefor; key means for limiting the movement of said actuating mechanism; means for controlling said actuating means comprising an operating shaft, a plate or arm attached to said shaft, connections from said plate or arm to said actuating mechanism; a governing means for said shaft; means for compelling a complete movement of said shaft in each direction; an operating handle; a spring and stop connection between said operating handle and said arm or plate attached to said shaft; and means for preventing a return of said handle toward normal position when said handle is forced out of normal relation to said arm or plate mounted on said shaft and against the tension of said spring connecting said handle and said arm or plate, substantially as described.

74. In a calculating machine, the combination of an accumulating mechanism; key-stems for limiting the movement thereof; an operating handle; connections between the same and said accumulating mechanism; and means for preventing the operative movement of said handle when any of said key-stems are in a partially depressed position, substantially as described.

75. In a calculating machine, the combination of an accumulating mechanism; dogs for actuating the same; and means for locking said dogs into locking relation to said accumulating mechanism and unlocking the same, consisting of an operating shaft, an arm rigidly mounted upon the same, a double faced pawl carried by said arm, a lever pivotally mounted near said arm, having projections at each end thereof to coöperate with said double faced pawl, a cam actuated by said lever having said projections, pivoted segments adapted to swing into locking position with reference to said dogs, and a yielding connection between said cam and said segments, substantially as described.

76. In a calculating machine, the combination of a series of accumulating dials; depressible key-stems for limiting the movement of said dials; means for latching said key-stems in depressed position; means for releasing said key-stems from said latched positions, consisting of an operating handle, an operating shaft, an arm rigidly mounted on said shaft, a pawl pivotally mounted on said arm an intermediate arm having a projection in the path of travel of said pawl on said rigid arm, sliding members for disengaging said typebars from said latched positions, a swinging bail adapted to operate said sliding members, and connections between said swinging bail and said intermediate arm; a releasing lever pivotally mounted axially with said operating handle; and connections between said releasing lever and said swinging bail, substantially as described.

77. In a calculating machine, the combination of a series of accumulating dials; depressible key-stems for limiting the movement of said dials; means for latching said key-stems in depressed positions; means for releasing said key-stems from said latched positions, consisting of an operating handle, an operating shaft, an arm rigidly mounted on said shaft, slidable members for releasing said key-stems from said latched positions, a swinging bail adapted to actuate said slidable members, and toggle lever connections between said rigidly mounted arm and said swinging bail; a releasing lever pivotally mounted axially with said operating handle; and connections between said releasing lever and said swinging bail, substantially as described.

78. In a calculating machine, the combination of a series of accumulating dials; depressible key-stems for limiting the movement of said dials; means for latching said key-stems in depressed positions; an operating handle; and a separable toggle lever means connected to said handle and operating to release said key-stems from said latched position by the straightening of said toggle during the return movement of said handle.

79. In a calculating machine, the combination of a series of accumulating dials; reciprocating members for actuating the same; engaging projections from said reciprocating members; depressible key-stems adapted to be engaged by said engaging projections and held in partial depressed positions by the latter; means for moving said reciprocating members with engaging projections into engagement with said key-stems; means for latching said key-stems in depressed position; and means for disengaging said key-stems from said latching means before said reciprocating actuating members have assumed normal positions, substantially as described.

80. In a calculating machine, the combination of a series of accumulating dials; depressible key-stems for limiting the movement of said dials; means for latching said key-stems in depressible positions; an operating handle and a separable toggle lever means connected to said handle and operating to release said key-stems from said latched position by the straightening of said toggle during the return movement of said handle; and means for rendering said separable toggle lever means ineffective, substantially as described.

81. In a calculating machine, the combination of a series of accumulating dials; depressible key-stems for limiting the movement of said dials; means for latching said key-stems in depressed positions; means for releasing said key-stems from said latched positions, consisting of an operating handle, an operating shaft, an arm rigidly mounted on said shaft, a releasing pawl pivotally mounted on said arm, an intermediate arm having a projection normally in the path of travel of said pawl on said rigidly mounted arm, a swinging bail for disengaging said key-stems from said latched positions, connections between said swinging bail and said intermediate arm, and means for throwing said projection on said intermediate arm out of the path of travel of said releasing pawl, substantially as described.

82. In a calculating machine, the combination of a series of accumulating dials; reciprocating members for actuating the same; an operating handle; a lever pivotally mounted in proximity to said operating handle; means for locking said reciprocating members and said dials against relative movement between them during the operation of said handle away from normal position; means connected to said pivotally mounted lever for rendering said locking means operative during said movement of said operating handle away from normal position, substantially as described.

83. In a calculating machine, the combination of a series of accumulating dials; reciprocating members for actuating the same; an operating handle; connections between said operating handle and said reciprocating members; means for locking said reciprocating members and said dials against any relative movement between them; a lever axially mounted with said operating handle; connections between said locking means and said axially mounted lever whereby the operation of said lever renders said locking means operative during the movement of said operating handle away from normal position; means governed by said operating handle for maintaining the locking engagement of said reciprocating members and said dials until said operating handle approaches the limit of its movement away from normal position; key-stems for governing the movement of said dials in a forward direction; means for holding said key-stems in depressed positions; means for releasing said key-stems from said depressed positions; and connections between said releasing means and said axially mounted lever, substantially as described.

84. In a calculating machine, the combination of a series of accumulating dials; reciprocating members for actuating said dials; means for engaging and disengaging said reciprocating members from operative connection with said dials; an operating handle; connections between said operating handle and said reciprocating members; a clearing lever axially mounted with said operating handle; connections between said operating handle and said engaging and disengaging means for said dials and reciprocating members, normally adapted to disengage said reciprocating members and said dials during the movement of said operating handle away from normal position; means operated by said clearing lever with said operating handle, for maintaining an engaged relation between said reciprocating members and said dials during the start of said operating handle away from normal position; means governed by said operating handle for disengaging said reciprocating members and said dials when said operating handle approaches the limit of its movement away from normal position; depressible key-stems for governing the movement of said dials in a forward direction; means for holding said key-stems in depressed positions; means for releasing said key-stems from said depressed positions; and connections between said releasing means and said clearing lever, substantially as described.

85. In a calculating machine, the combination of a series of accumulating dials; reciprocating members for rotating said dials; means for engaging and disengaging said reciprocating members from operative connections with said dials; an operating handle; connections between said operating handle and said reciprocating members; a pivotally mounted clearing lever; connections between said operating handle and said engaging and disengaging means for said dials and reciprocating members normally adapted to disengage said reciprocating members and said dials during the movement of said operating handle away from normal positions; means operated by said clearing lever for maintaining an engaged relation between said reciprocating members and said dials during the start of said operating handle away from normal position; means governed by said operating handle for disengaging said reciprocating members and said dials when said operating handle reaches the limit of its movement away from normal position; depressible key-stems for governing the movement of said dials in a forward direction; means for holding said key in depressed positions; and connections between said releasing means and said clearing lever, substantially as described.

86. In a calculating machine, the combination of a series of accumulating dials; an operating handle for driving said dials; depressible key-stems for limiting the movement of said dials; means for holding said key-stems in depressed positions; means for releasing said key-stems from depressed positions; and connections from said operating handle and said releasing means for releasing said key-stems independent of the movement of said operating handle.

87. In a calculating machine, the combination of a series of accumulating dials; depressible key-stems for limiting the movement of said dials; means for latching said key-stems in complete depressed positions; operating mechanism for actuating said dials; means connected to said actuating means for releasing said key-stems from said complete depressed positions during the return movement of said actuating means; means for engaging said key-stems after being so released from said completely depressed positions, and holding them against movement out of operative positions for limiting the movement of said dials; and means for finally releasing said key-stems and returning them to normal positions after said dials have completed their movements, substantially as described.

88. In a calculating machine, the combination of a series of accumulating dials; depressible key-stems for limiting the movement of said dials; means for latching said key-stems in complete depressed position; an operating handle; and means connected to said handle for causing a step-by-step release of said key-stems during the return movement of said handle, substantially as described.

89. In a calculating machine, the combination of a series of accumulating dials; depressible key-stems for limiting the movement of said dials; means for latching said key-stems in complete depressed positions; an operating handle; means connected to said handle for unlatching said key-stems from said completely depressed positions; and means for engaging said key-stems after being so released and holding the same against movement toward normal positions until after said dials have come to rest, substantially as described.

90. In a calculating machine, the combination of a series of accumulating dials; an operating handle normally adapted to drive said dials in a forward direction; a resetting lever pivotally mounted on said operating handle; means operated by said resetting lever whereby during the operation of said operating handle said dials will rotate backwardly to the "0" points thereon.

91. In a calculating machine, the combination of a series of accumulating dials; a removable operating handle normally adapted to drive said dials in a forward direction; a resetting lever pivotally mounted on said removable operating handle; and means operated by said resetting lever whereby during the operation of said operating handle said dials will rotate backwardly to the "0" points thereon.

92. In a calculating machine, the combination of a series of accumulating dials; an operating handle normally adapted to drive said dials in a forward direction; a clearing lever axially mounted with said operating handle; means connected to said clearing lever whereby during the operation of said clearing lever said operating handle will rotate said dials backwardly to "0" point thereon; key-stems for governing the forward movement of said dials; means for holding said key-stems in depressed positions; means for releasing said key-stems from such depressed positions; and connections from said releasing means and said axially mounted lever, substantially as described.

93. In a calculating machine, the combination of a series of accumulating dials; an operating handle normally adapted to drive said dials in a forward direction; a resetting lever; means connected to said resetting lever whereby during the operation of said lever, said operating handle will rotate said dials backwardly to the "0" points thereon; key-stems for governing the forward movement of said dials; means for releasing said key-stems from depressed positions; and connections from said releasing means and said resetting lever, substantially as described.

94. In a calculating machine, the combination of a series of accumulating dials; rotatable members moving in synchrony therewith; sectors axially mounted with said rotatable members; dogs carried by said sectors; reciprocating racks in engagement with said racks; an operating handle; means operated by said handle for reciprocating said racks; stops for limiting the backward rotation of said dials at "0" point; means connected to said handle for locking said dogs in engagement with said rotatable members before said racks start in their movement away from normal positions; means operated by said handle for unlocking said dogs from engagement with said rotatable members after said dials have been stopped at said "0" point; means for locking said dogs and said rotatable members against any relative movement between them, before said racks start on their movement toward normal position; stops for limiting the movement of said racks away from normal positions after said dogs have been so released from locking engagement with said rotatable members, said stops being so located that all save the first right hand rack are arrested in their movement away from normal at such a point that the return of said racks to normal positions will rotate said dials coöperating with said stops respectively, nine spaces, and that said first right hand rack will be arrested at a point sufficient to rotate its coöperating dial ten spaces when said first right hand rack is restored to normal position; and a detent operated in synchrony with said dog locking means for locking said dials against rotation when said dogs are disengaged from locking connection with said rotatable members, substantially as described.

95. In a calculating machine, the combination of a series of accumulating dials; reciprocating members for actuating said dials; dogs carried by said reciprocating members; an operating handle; means operated by said handle for moving said reciprocating members; stops to limit the backward rotation of said dials at the "0" point; means connected to said handle for locking said dogs in engagement with said dials before said reciprocating members start in their movement away from normal; means operated by said handle for unlocking said dogs from locking engagement with said dials after said dials have been stopped at said "0" point; means for locking said dogs in engagement with said dials before said reciprocating members start on their movement toward normal positions; stops for limiting the movement of said reciprocating members away from normal positions after said dogs have been released from locking engagement with said dials, said stops being so located that all save the first right hand reciprocating members when returning toward normal position will rotate said dials nine spaces, and said first right hand reciprocating member move its coöperating dial ten spaces; and a detent operated by said handle, for locking said dials against rotation while said dogs are released from locking engagement with said dials, substantially as described.

96. In a calculating machine, the combination of a series of accumulating dials; reciprocating members for actuating the same; means for locking said reciprocating members and said dials against relative movement between them during the movement of said reciprocating members away from normal positions; stops for limiting the backward rotation of said dials at the "0" point; means for disengaging said reciprocating members and said dials after said "0" points on said dials have been reached; means for locking said reciprocating members and said dials before the return movement of said reciprocating members; stops for limiting the forward movement of said reciprocating members so arranged that all save the first right hand reciprocating member when returning toward normal positions will move their coöperating dials nine spaces, and said first right hand reciprocating member will move its coöperating dial ten spaces, substantially as described.

97. In a calculating machine, the combination of a series of accumulating dials; reciprocating members for actuating the same; stops for limiting the backward rotation of said dials at the "0" point; means for causing an operative engagement between said dials and said reciprocating members during the movement of the latter away from normal positions; means for disengaging said reciprocating members and said dials when the latter are stopped at said "0" points; means for moving said reciprocating members forward when disengaged from said dials; means for reëngaging said reciprocating members and said dials before said reciprocating members start on their movements toward normal positions; stops to limit the forward movement of said reciprocating members so arranged that all save the first right hand reciprocating member when returning toward normal positions will move their respective coöperating dials nine spaces, and so that said first right hand reciprocating member will move its coöperating dial ten spaces, substantially as described.

98. In a calculating machine, the combination of a series of accumulating dials; an operating handle; means governed by the movement of said handle in one direction for returning said dials backwardly to the "0" point thereon; means governed by the movement of said handle in the other direction for rotating all of said dials save the first right hand one forwardly nine spaces, and for rotating said first right hand dial ten spaces; and means for successively carrying over the tens from one dial to the other, substantially as described.

99. In a calculating machine, the combination of a series of accumulating dials; means for rotating said dials backwardly to the "0" point thereon; means for rotating all of said dials except the first right hand one forwardly, after such "0" point shall have been reached in said backward rotation of said dials, nine numeral spaces, and for rotating said first right hand dial forwardly ten spaces; and means for successively carrying over the tens from one dial to the other toward the left, substantially as described.

100. In a calculating machine, the combination of a series of accumulating dials; reciprocating members for actuating the same; an operating handle; a resetting lever axially mounted with said operating handle; means for locking said reciprocating members and said dials against relative movement between them during the operating of said operating handle away from normal position; means connected to said resetting lever for rendering said locking means operative during said movement of said operating handle away from normal position, substantially as described.

101. In a calculating machine, the combination of a series of accumulating dials; a removable operating handle normally adapted to drive said dials in a forward direction; a resetting lever pivotally mounted on said removable operating handle; means operated by said resetting lever for rendering said operating handle operative in resetting the said dials to the "0" points thereon; key-stems for governing the forward movement of said dials; means for releasing said key-stems from said depressed positions; and connections between said releasing means and said means operated by said resetting lever, for rendering said operating handle operative in resetting, substantially as described.

102. In a calculating machine, the combination of a series of accumulating dials; an operating handle normally adapted to drive said dials in a forward direction; a resetting means carried by said operating handle; and suitable connections therefrom whereby, during the operation of said resetting means, said operating handle will rotate said dials backwardly to the "0" points thereon.

103. In a calculating machine, the combination of a series of accumulating dials; an operating handle normally adapted to drive said dials in a forward direction; mean sfor rendering said operating handle operative in rotating said dials backwardly to the "0" points thereon; depressible key-stems for governing the forward movement of said dials; means for holding said key-stems in depressed positions; means for releasing said key-stems from depressed positions; and operative connections from said releasing means to said means for rendering said operating handle operative in said backward rotation of said dials, substantially as described.

104. In a calculating machine, the combination of a series of accumulating dials; reciprocating members for driving said dials; means for engaging said reciprocating members with said dials; key-stems adapted to be abutted by said reciprocating members and limit the movement thereof in one direction; rigid non-slidable connections between said abutting points on said reciprocating members and said dials when said reciprocating members are engaged with said dials; an operating handle for actuating said reciprocating members in both directions; and a spring and stop connection between said operating handle and said reciprocating members, substantially as described.

105. In a calculating machine the combination of a series of accumulating dials; reciprocating members for driving said dials; means for engaging said reciprocating members with said dials; key means having stops connected therewith movable into the path of travel of said reciprocating members; means for actuating said reciprocating members until the latter abut said key means when said stops are moved into the path of travel of said reciprocating members; and a rigid non-slidable connection between the abutting portion of said reciprocating members and their coöperating dials respectively, when said dials are in engagement with said reciprocating members, substantially as described.

In witness whereof, I have hereunto set my hand and seal in the presence of two witnesses.

GLENN J. BARRETT. [L. S.]

Witnesses:
L. G. GREENFIELD,
F. G. TALLMAN.